United States Patent [19]
Chehikian et al.

[11] 4,085,401
[45] Apr. 18, 1978

[54] CHARACTER RECOGNITION SYSTEM

[75] Inventors: Alain Chehikian, Grenoble; Gerard Bouvièr, Sassenage, both of France

[73] Assignee: Agence Nationale de Valorisation de la Recherche, France

[21] Appl. No.: 656,905

[22] Filed: Feb. 10, 1976

[30] Foreign Application Priority Data

Feb. 14, 1975 France .................. 75 04584

[51] Int. Cl.² .................................... G06K 9/12
[52] U.S. Cl. ................. 340/146.3 AE; 340/146.3 AC
[58] Field of Search ............ 340/146.3 H, 146.3 MA, 340/146.3 R, 146.3 AE, 146.3 AC

[56] References Cited

U.S. PATENT DOCUMENTS

| | | | |
|---|---|---|---|
| 3,522,586 | 8/1970 | Kiji et al. ................. | 340/146.3 MA |
| 3,541,511 | 11/1970 | Genchi et al. ............. | 340/146.3 AC |
| 3,613,080 | 10/1971 | Angeloni et al. .......... | 340/146.3 AC |
| 3,723,970 | 3/1973 | Stoller ...................... | 340/146.3 MA |
| 3,936,800 | 2/1976 | Ejiri et al. ................. | 340/146.3 MA |

Primary Examiner—Leo H. Boudreau
Attorney, Agent, or Firm—William Anthony Drucker

[57] ABSTRACT

The invention relates to pattern recognition of binary numbers corresponding respectively to the different elementary zones of the pattern of a character. The system consists in defining the orientation of the character in its various points which are then supplied to different memories according to their orientation. The character is then characterized by 21 binary variables defined by the existence or absence of given orientation segments in 21 predetermined zones. These variables are decoded.

6 Claims, 41 Drawing Figures

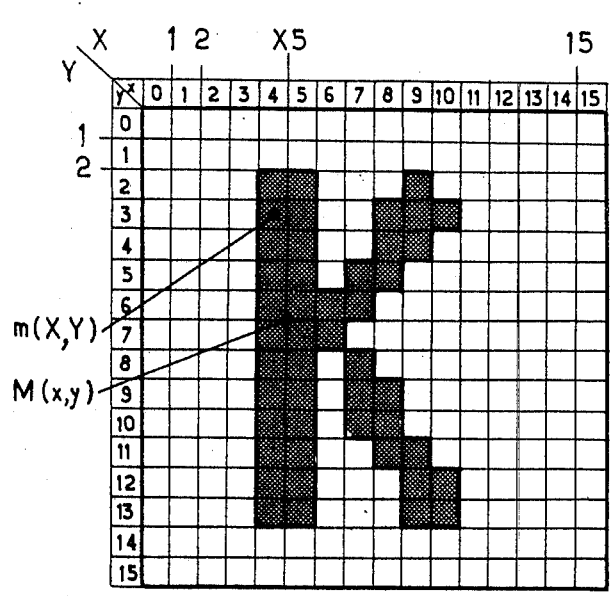
Fig. 1
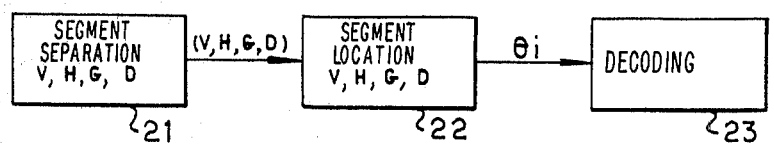
Fig. 2
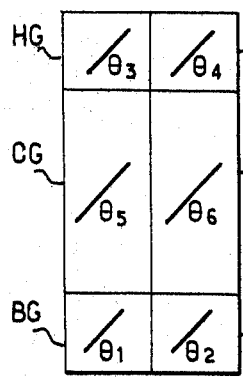
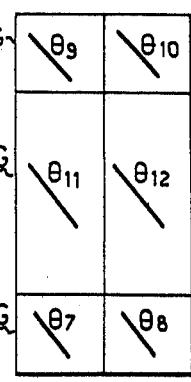
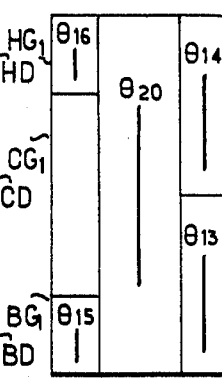
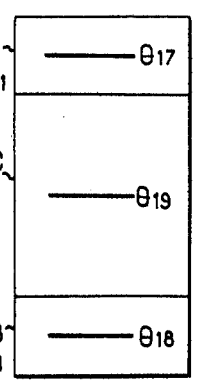
Fig. 3a　　Fig. 3b　　Fig. 3c　　Fig. 3d

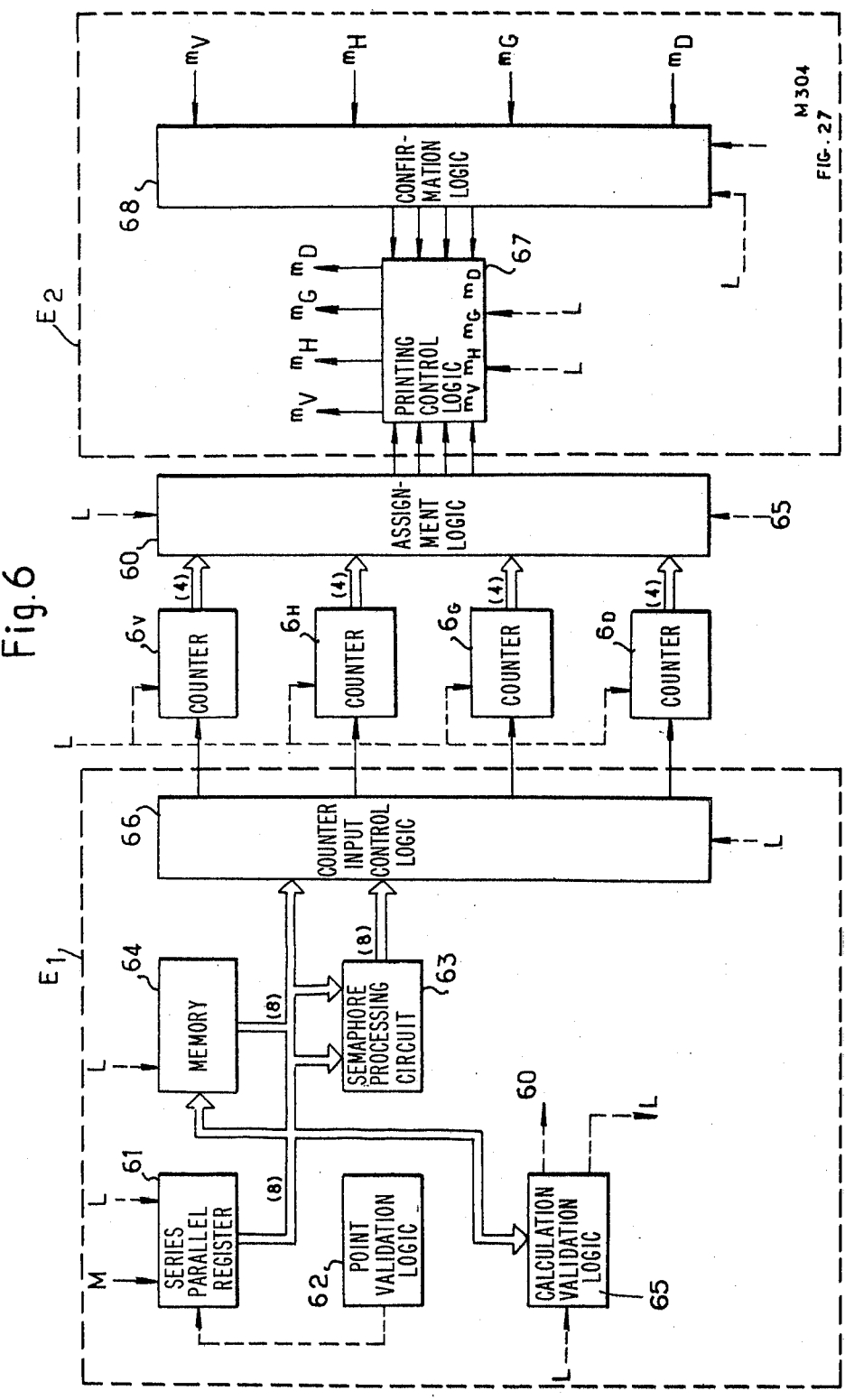

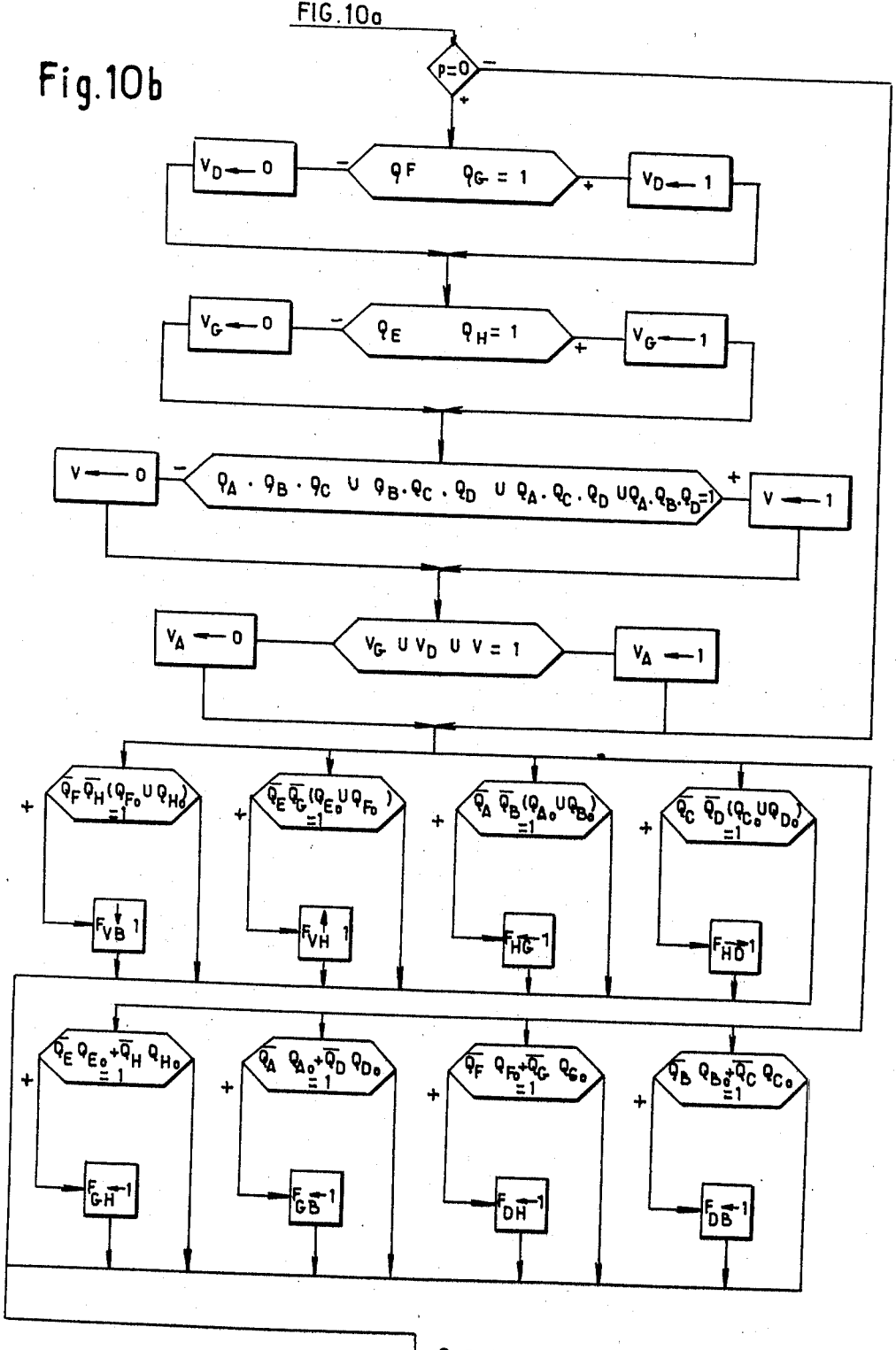

CHARACTER RECOGNITION SYSTEM

BACKGROUND OF THE INVENTION

The present invention relates to pattern recognition systems which are used more particulary for the automatic reading of printed or typed texts.

It relates more specifically to systems in which the reading of the characters is performed in such a way that there is a system of binary numbers for each character, whereby each binary number corresponds to the presence or absence of an element of the character in a specific zone of elementary surface.

In these systems the reading or acquisition device supplies for each character a certain number of binary data, which together correspond to the character in question. This number, which depends on the sharpness of definition of the character is relatively high, for example 256.

No matter whether the acquisition of the character in the form of P binary numbers has been performed with a view to the subsequent restoring of the character or with a view to its recognition for processing in a data processor (case of a number automatically "read" at the input of a calculation circuit), in the known machines all the said data must be retained because the character is only identifiable by all the said data.

BRIEF SUMMARY OF THE INVENTION

The present invention has for its object a system for processing the said P data for the purpose of recognising the data, which makes it possible to reduce the number of useful data characterizing a given character.

Hereinafter, with a view to making the terminology more readily comprehensible, the term "character" is used both to designate the actual pattern to be recognised and to designate the P binary numbers corresponding thereto in the acquisition process.

In addition, the term "point" will be used to designate a geometrical point of the character, as well as to designate a memory point, i.e. the binary number corresponding to a particular elementary zone.

For the greater clarity of the text and to facilitate comprehension, it is assumed hereinafter that the zones of the character to which the P binary numbers correspond have been defined by the respectively horizontal and vertical coordinate axes.

The system according to the invention sucessively performs (i) - the pre-processing of the character leading to the separation of the vertical, horizontal, positively inclined diagonal and negatively inclined diagonal segments forming the same, whereby the curved lines are considered to be formed by a succession of segments with different slopes;

(ii) - the location of the various constituent segments of the character;

(iii) - the recognition of the actual patterns.

A first stage of the system effects a segment point transformation, whereby the data defining the character at the output of this stage are separated in accordance with the orientation of the character at the point in question.

A second stage effects the reduction of the data, whereby the total number of data obtained is the sum of the numbers of location zones for each segment direction. For the recognition of the alphanumerical characters (64 characters: 27 small letters, 27 capital letters and 10 figures) it was found useful to define 21 zones: six zones for the location of positively inclined diagonals (sloping to the right) and six zones for the location of negatively inclined diagonals (sloping to the left), six zones for the location of the vertical lines and three zones for the location of the horizontal lines.

At the output of this stage, the character is characterized by T binary variables, 21 in the case of alphanumerical characters, each of them indicating the presence or absence of a given orientation segment in a given zone.

The third stage substantially effects a code conversion or decoding in accordance with the intended use, which can be brought about by a simple combinatory logic when the number of characters to be recognised is small, as is the case for all standard alphanumerical characters. In the case of more complex or more numerous characters (cyrillic alphabet, ideographs, etc.) code conversion will be more advantageously performed by comparing the values of the binary variables with stored blocks of values equal to the values of these variables. The said blocks correspond respectively to the different characters to be recognised.

A processing device according to the invention comprises:

a circuit for calculating the integrals of the memory points located on either side of a given mesh apex (as defined hereinafter) in accordance with the horizontal, vertical, positively inclined diagonal and negatively inclined diagonal direction;

a circuit for assigning these points to a horizontal, vertical or oblique segment, by comparing the various integrals obtained and eliminating incorrect indications by controlling the presence of at least one adjacent point on the segment retained for a mesh apex point;

a circuit for calculating the zones defining for each character a certain number of zones by comparing the coordinates of all the points;

a circuit for locating the various segments in the said zones, supplying binary variables characterizing the character;

a system of elementary logic circuits ensuring the decoding of these variables.

In the special case where the characters have been obtained by means of the acquisition device described in French Pat. Specification No. 73.46285, filed by the Applicant on Dec. 26th 1973 and entitled "Text acquisition device for pattern recognition machine" in which the information on a character is obtained in series by scanning along the Cartesian coordinates and is stored in a memory with series output and access, with 256 addresses, a circuit for calculating the integrals, has two series-parallel registers with eight outputs, respectively for the horizontal and vertical coordinates of the points. Four adders carry out the calculations of the integrals along the horizontal, vertical, positively inclined diagonals and negatively inclined diagonal segments (taking as the origin the apex of a mesh defined by four elementary acquisition surfaces).

The zone calculating circuit has two parallel-parallel registers defining the sub-block occupied by the character and calculating circuits defining the coordinates of the limits of the various location zones.

The circuit for assigning the segments to the various zones, i.e. the definition of the variables characterizing the character comprises coincidence circuits for the address of one segment with any random address in the zone in question.

The decoding circuit comprises a system of logic circuits expressing the simultaneous presence of certain of these variables and the absence of certain others.

A control logic ensures the automatic transmission of data from the acquisition memory to the recognition circuits.

In the particular case in question, the data relative to one character are reduced from 256 acquisition values to 21 binary values, so that data storage is considerably simplified. Moreover, the decoding circuits are reduced to a simple combination of elementary logic circuits.

BRIEF DESCRIPTION OF THE DRAWINGS

Other objects of the present invention will become apparent from the following description. The accompanying drawings show by way of illustration preferred embodiments of the present invention.

In the drawings:

FIG. 1 is a diagram of a character pattern;

FIG. 2 is a simplified diagram of the system according to the invention;

FIGS. 3a–3d illustrate the location zones;

FIG. 6 is a block diagram of an embodiment of one of the circuits of FIG. 5;

FIGS. 9, 10a, 10b; 11a and 11b, are flow charts of the circuits of FIG. 6;

DETAILED DESCRIPTION OF THE PREFERRED EMBODIMENTS

It is assumed hereinafter that the character to be recognised has been obtained in the manner indicated in the above-mentioned French Patent.

In this case, the character to be recognised is stored in a memory organised into 16 lines of 16 points. The information stored for each element of this memory is 1 or 0, depending on whether or not the corresponding point belongs to the character. The address of an element of the memory is defined by $(x, y)$. In this way a Boolean function $M(xy)$ were $0 \leq x \leq 15, 0 \leq y \leq 15$ is defined, which characterises the character, itself constituted by a system of adjacent black or white squares, as shown in FIG. 1. To facilitate comprehension, the corresponding memory point is also called $M(xy)$.

The system is shown diagrammatically in FIG. 2.

At 21, the segment separation operation is performed. The memory points $M(xy)$ are compared with one another in such a way as to determine whether a point $m(X,Y)$, the apex of a mesh $(1 \leq X \leq 15; 1 \leq Y \leq 15)$ defined by the squares forming the character (cf FIG. 1) belongs to a horizontal segment (H), vertical segment (V), positively inclined diagonal segment (D) or negatively inclined diagonal segment (G). To facilitate comprehension, these segments are designated by H, V, D, G hereinafter.

The various previously recognised segments are located at 22, leading to the determination of 21 binary variables $\theta1$ to $\theta21$ corresponding generally to the zones indicated in FIGS. 3a, 3b, 3c, 3d respectively for segments D, G, V, H. The delimitation of these zones will be explained hereinafter, it being understood that the number of zones selected depends on the number of characters which it is possible to recognise and on their graphic differentiation. A segment located in one zone can be positioned anywhere within it. The slopes of the diagonal segments can differ and only their general orientation is in fact considered.

Finally, the code conversion or decoding of these variables by a combinatory logic is performed at 23, and each character is characterized by the simultaneous presence of certain of these variables and the absence of certain others.

Figure 4:
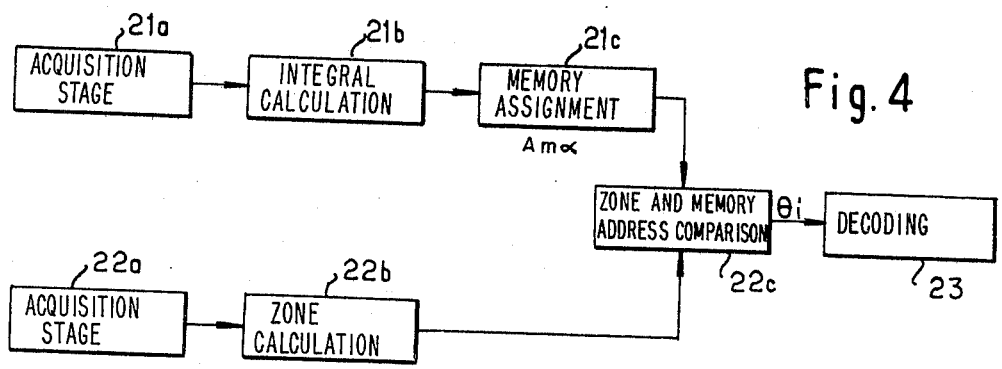
FIG. 4 is a more detailed synoptic diagram of the system.

According to a preferred embodiment illustrated by FIG. 4:

the separation operation of V, H, G and D comprises an acquisition stage (21a) of the memory points $M(x,y)$ located around a mesh apex $m(X,Y)$, a calculation stage (21b) during which are calculated the integrals of the memory points located on the verticals, horizontals or diagonals relative to apex $m(X,Y)$ and a comparison stage (22c) of the said integrals resulting in the assignment of apices $m(X,Y)$ to different memories with $m\alpha$ (with $\alpha = V, H, G, D$) in accordance with the segment to which this apex belongs;

the segment location operation comprises an acquisition stage (22a) of all the points $M(x,y)$, a calculation stage (22b) for the parameters defining the various zones among which the various segments are distributed and a stage (22c) for comparing the coordinates of the apices $m(X,Y)$ stored in memories $m\alpha$ with those defining the zones.

The operations of stages 22a and 22b can be performed before, during or after stages 21a, 21b and 21c.

Figure 5:
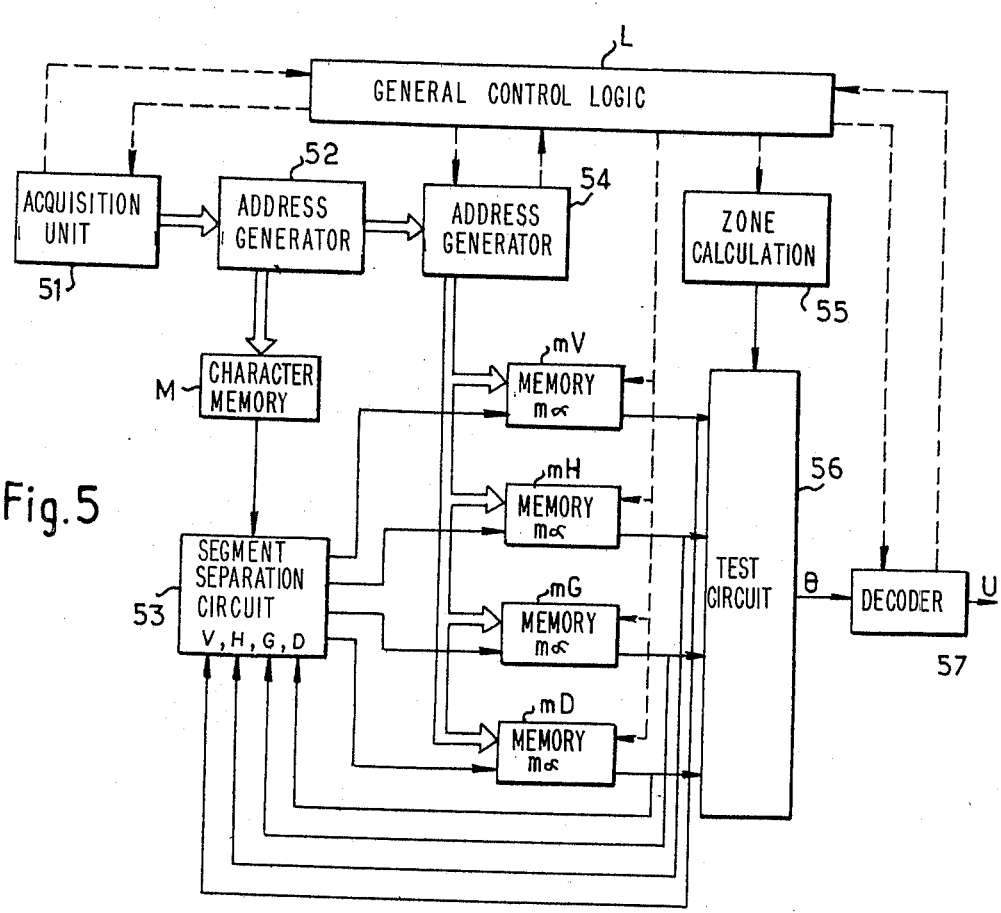
FIG. 5 diagrammatically illustrates a complete shape recognition device according to the invention.

FIG. 5 is a block diagram of a pattern recognition machine comprising according to the present invention.

In this diagram, the acquisition system, which does not form an object of the present invention, is generally denoted by reference numeral 51. The processing device comprises:

a memory M in which are stored the binary signals representing a character;

an address generator 52 for memory M;

an extraction circuit 53, for the vertical, horizontal, positively inclined diagonals and negatively inclined diagonals;

four memories with $m\alpha$ with $\alpha = H, V, D, G$ for the segments extracted at 53, these memories being are addressed by address generator $m$, 54, itself controlled by address generator M52, the relationship between the addresses (X,Y) of one apex of the mesh and the addresses (x,y) of the points M being apparent on FIG. 1.

Circuit 53 and memories $m\alpha$ perform the operations of stages 21a to 21c, whereas a zone calculating circuit 55 performs the operations of stages 22a and 22b and a test circuit 56 carries out the characterization of the character (stage 22c). This circuit determines in which zones, defined by circuit 55, are located the segments stored in $m$ and thus defines the 21 variables $\theta i$. The processor further comprises a decoder 57 (stage 23), and the output of this decoder is connected to utilization devices U, e.g. a display system such as nixie tubes.

Obviously, separate address generators and memories can be used if necessary for acquisition and recognition purposes.

The acquisition and recognition circuits are advantageously automatically synchronized by a single control logic L which transmits operating commands to the various circuits, these commands being both programmed in the internal logic of L and controlled by signals from the various circuits, as indicated by the various arrows.

These commands define the operating phases of the various circuits. The processor operates in ten phases, $\Phi 0$ to $\Phi 9$, explained hereinafter.

For reasons of clarity, the drawing shows by:

single continuous lines the functional connections effecting the transfer of data from one circuit to another;

double lines, the connections effecting the transfer of addressing information from the memories (these connections carry multiple signals, whose number is equal to that of the address bits);

broken lines, the connection used for transferring commands. The various signals carried by the various connections will be explained in greater detail hereinafter, in connection with the description of the preferred embodiments with reference to the drawings.

Figure 6A:
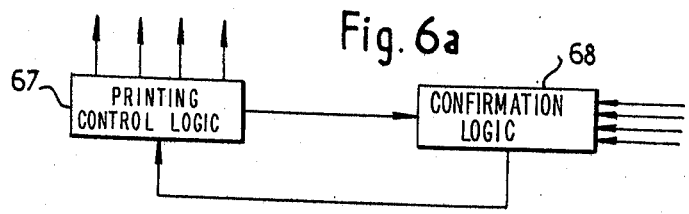
FIG. 6a is a detail of FIG. 6.

FIG. 6 is a block diagram of an embodiment of the circuit for the extraction of segments V, H, D and G.

To determine whether a mesh apex $m(X,Y)$, belongs to a V, H, G or D segment, four integrals $I_V$, $I_H$, $I_D$, $I_G$ are calculated, these being the discreet sums of memory points $M(x,y)$ on either side of the apex in question, along vertical orientation segments for $I_V$, horizontal segments $I_H$, positively inclined diagonal segments for $I_D$ and negatively inclined diagonal segments for $I_G$.

The addresses of the following eight point $M(x,y)$ are used in the calculation of the integrals:

| | |
|---|---|
| $x = X + n$ | ; $Y = Y + p$ |
| $x = X + n$ | ; $y = Y - (1 + p)$ |
| $x = X - (1 + n)$ | ; $y = Y + p$ |
| $x = X - (1 + n)$ | ; $y = Y - (1 < p)$ |
| $x = X + p$ | ; $y = Y + n$ |
| $x = X + p$ | ; $y = Y - (1 + n)$ |
| $x = X - (1 + p)$ | ; $y = Y + n$ |
| $x = X - (1 + p)$ | ; $y = Y - (1 = n)$ |

These integrals are written $$ID = \sum_{n=0}^{n_{max}} \sum_{p=n}^{p_{max}} M[X - (n+1), Y + p] M[X + n, Y - (p + 1)]$$

$$+ M[X - (p + 1), Y + n] M[X + p, Y - (n + 1)]$$

$$IG = \sum_{n=0}^{n_{max}} \sum_{p=n}^{p_{max}} M[X - (n + 1), Y - (p + 1)] M[X + n,$$

$Y + p] + M[X - (p + 1), Y - (n + 1)] M[X + p, Y + n]$ $$I_V = \sum_{p=0}^{p'_{max}} M[X - 1, Y - (p + 1)] M[X, Y - (p + 1)] +$$

$M[X - v1, Y + p] M[X, Y + p]$ $$I_H = \sum_{p=0}^{p'_{max}} M[X - (p + 1), Y - 1] M[X - (p + 1), Y] +$$

$M[X + p, Y - 1] M[X + p, Y]$ in which $n_{max}$ and $p_{max}$ are equal to the smallest values of $k$ defined by the inequations $x - (1 + k) \geq 0$, $x + k \leq 15$, $y - (1 + k) \geq 0$, $y + k \leq 15$ and where $p'_{max}$ is the largest of the values defined by these inequations.

The memory points taken into consideration for the calculation of $I_V$: correspond to points located on the verticals adjacent to the apex of mesh $m(X,Y)$;

$I_H$: correspond to points located on the horizontals adjacent to $m(X,Y)$;

$I_D$: correspond to points located on the diagonals passing through $m(X,Y)$, sloping to the right;

$I_G$: correspond to points located on diagonals passing through $m(X,Y)$, sloping to the left.

The orientation segments in question have a width of the order of twice that of an elementary acquisition surface.

Thus, these integrals are measures of whether the mesh apex respectively belongs to a horizontal, vertical, positively inclined diagonal or negatively inclined diagonal segment. The decision to assign an apex to one of these different segments is taken as a function of the relative value of these integrals.

The circuit diagram of FIG. 6 substantially comprises:

counters $6_V$, $6_H$, $6_G$ and $6_D$ counting the said integrals;

a logic 60 which assigns the apices in accordance with the relative values of the integrals; this logic assigns the points in accordance with the algorithm shown in FIG. 7, to be explained hereinafter;

systems of ancillary circuits $E_1$ and $E_2$, whose function is substantially:

for circuit $E_1$: to supply the elementary calculation values to the counters;

for circuit $E_2$: to effect the entry in memories $m_V$, $m_H$, $m_G$, $m_D$ of the values retained on the one hand during the calculation and on the other after segmentation, i.e. after eliminating parasitic points, whose possible existence will be explained hereinafter.

In the drawing, the numbers in brackets on the double connecting line indicate the number of simultaneously carried pieces of information.

The circuits $E_1$ have been designed in such a way as to operate automatically whatever the values of $x$ and $y$. They have calculation validation means, depending on whether the corresponding values of the coordinates do or do not come from the memory.

The circuits $E_1$ comprise:

a series-parallel register 61;

a memory point validation logic 62;

a semaphore processing circuit 63;

a group of memories 64;

a calculation validation logic 65;

a counter input control logic 66.

The circuits $E_2$ comprise a logic 67 for printing in memories $m\alpha$ and a logic 68 for confirming the points printed in memories $m$.

A signal input of series-parallel register 61 is connected to the output of memory M (cf FIG. 6). This register also has a control input, connected to the output of point validation logic 62 and a synchronization input connected to the general logic L. The register comprises eight parallel outputs on which are available the values (0 or 1) of the eight points which are used in the calculation of the integrals.

An ancillary circuit 62, called the "memory point validation logic" assigns the value zero to its outputs as soon as the address of one point locates the same outside the memory. This logic compares the addresses $X = n$, $X = (1 + n)$, $X + pX - (1 + p)$ on the one hand, $Y + p$, $Y - (1 + p)$, $Y + n$, $Y - (1 + n)$ on the other hand with the minimum values (0) and maximum values (15) which can be assumed by the addresses of the memory points M. Moreover, as it should not be taken account of the points which do not belong to the segment of point $M(xy)$ the circuit 63 processes semaphores which are applied to the control logic of the counters and by the same eliminate the contribution of these points to the calculation of the integrals (this case being illustrated for example in FIG. 8, where, for an upwardly directed vertical segment corresponding to point $m(X,Y)$, a semaphore is placed. This semaphore is placed when the memory points of addresses $X-(1+p)$, $Y-(1+n)$ and $X-(1+n)$, $Y+p$ are 1 for $p=0$ and when one of them is zero for $p=1$ (cross $e_0$, $g_0$, $e_1g_1$ in FIG. 8). In this case account must not be taken of the subsequent points ($p = 2, 3 \ldots$), even if they are equal to 1 for the calculation of $I_V$. To process these semophores the circuit 63 must have values at the register outputs which correspond to a pair of values n,p and preceeding values supplied thereto by memory 64, whose access is also synchronized by logic L (FIG. 5).

The counter control logic 66 authorises the output signals from register 61 to enter a counter $I\alpha(\alpha = V, H, G, D)$ if:

this signal corresponds to one of the terms of the integral calculated by the counter in question, and if there is no semaphore for the integral in question.

When the entire memory has been scanned for a given pair of values XY, counters $6_V$, $6_H$, $6_G$, $6_D$ contain the values of the integrals.

Figure 7:
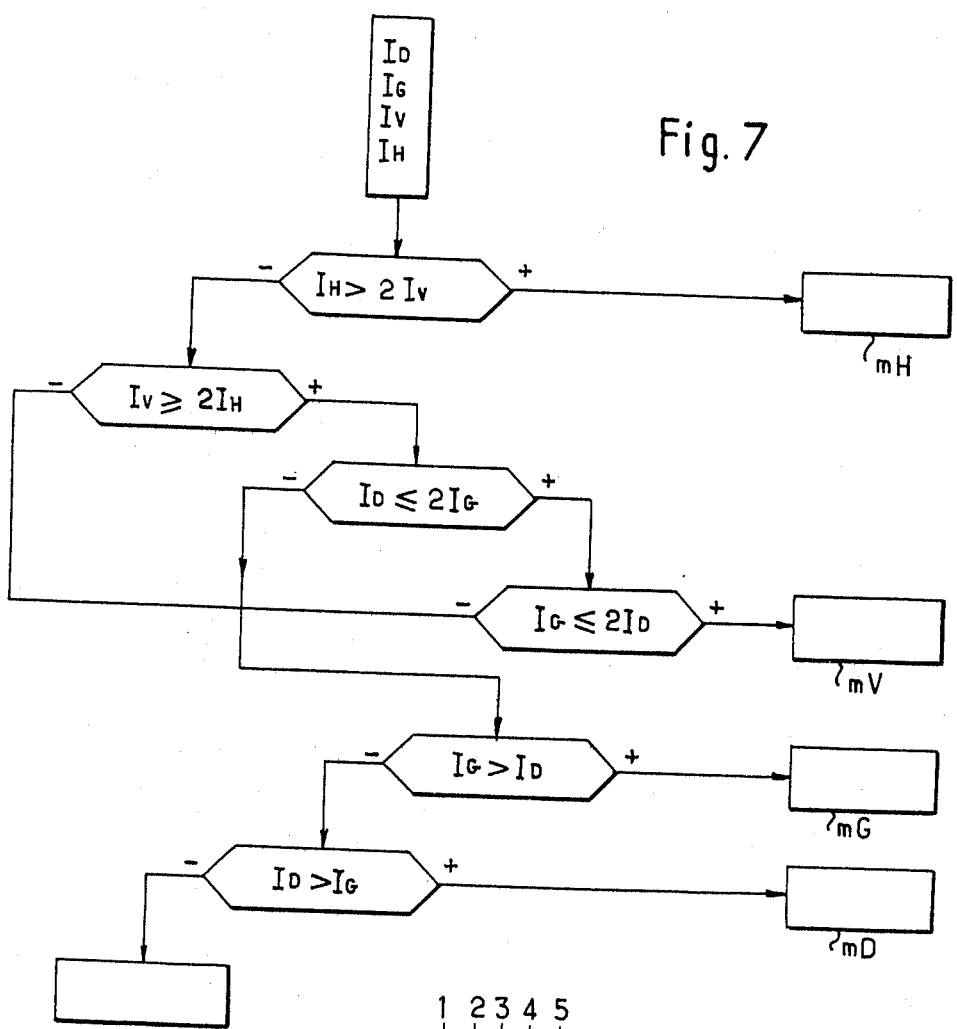
FIG. 7 shows the algorithm effected by circuit 60 of FIG. 6.

FIG. 7 shows a preferred algorithm used by logic 60 for assigning points $m(X,Y)$ to one of the memories $m_V$, $m_H$, $m_G$, $m_D$.

The symbols used are as follows. Each hexagon shown represents a query asked in the given direction, e.g. the upper hexagon corresponds to the question: "is $I_H$ greater than $21_V$?". If the answer is "yes," the operation indicated at output "+" of the hexagon is performed. In the opposite case, the operation indicated at the output "−" is performed.

Thus, if $I_H$ is greater than $21_V$, the point is assigned to a horizontal segment, i.e. "1" is printed out in memory $m_H$ at address X, Y.

The indicated algorithm has been used for its simplicity. It is not symmetrical, giving initial preference to the horizontal lines. Whilst retaining the same operating diagram, it would obviously be possible to invert $I_V$ and $I_H$ on one hand, and $I_G$ and $I_D$ on the other. A symmetrical algorithm would then be obtained, but this would lead to a more complicated circuit without any practical interest.

When an apex $m(XY)$ has been assigned to one of the memories $m$, the operation is restarted with a new apex, provided that this new apex belongs to one segment of the character. This is acknowledged by the fact that in the four elementary surfaces whose apex $m(X,Y)$ is the common apex, there are at least three "1" or two "1" positions symmetrically arranged relative to this apex. It is the function of the calculation validation logic 65 to establish whether this is the case. If this is the case or not, logic 65 transmits validation signals to the assignment logic. Logic 65 also transmits an information signal to the general logic L for the sequence of operations of the system.

This assigment operation is performed for all the apices of the character. At the end of the operation the apices $m(X,Y)$ are distributed over memories $m_V$, $m_H$, $m_G$, $m_D$ which respectively contain the apices place on the horizontal, vertical, negatively inclined diagonal and positively inclined diagonal segments. During this operation there has been no reduction of the actual information but merely a transformation of the points $M(xy)$ into $m(X, Y)$.

The input into memories $m$ is performed under the control of circuits $E_2$ which comprise a print-out logic 67 and a confirmation logic 68.

The confirmation logic compares the signals stored in the memory $m$ in accordance with the following criteria:

a point located in the memory $m_V$ is confirmed if there is at least one adjacent point on the same vertical line, i.e. at the same address X;

a point located in memory $m_H$ is confirmed if there is at least one adjacent point on the same horizontal line, i.e. at the same address Y;

a point located in a memory $m_D$ or $m_G$ is confirmed if there is at least one adjacent point on the diagonal at 45° of the same orientation passing through this point, i.e. at one of the addresses $(X + 1, Y - 1)$ or $(X - 1, Y + 1)$ for memory $m_D$ and one of the addresses $(X - 1, Y - 1)$ or $(X + 1, Y + 1)$ for the memory $m_G$.

The print-out logic 67 of the said memories permits the branching of the correct information to the print input of the memories $m$, i.e. depending on the operating phase reached; this logic performs the print-out operation from the assignment logic 60, or the print-out operation (point confirmed) or the erasure (point not confirmed) from the confirmation logic 68. The various operating phases are synchronized by general logic L.

The flow of information from memory M (FIG. 5) to the counters is illustrated by the flow charts of FIGS. 9, 10a, 10b, 11a and 11b and is programmed in accordance with the flow charts by control logic L.

Figure 12:
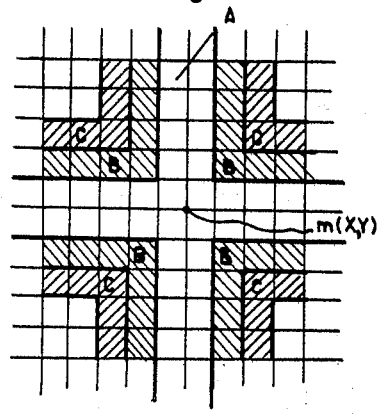
FIGS. 12, 13 and 14 are explanatory diagrams.

In accordance with the flow chart of FIG. 10, the scanning of memory $M(x,y)$ around apex $m(XY)$ shown in FIG. 1, in order to extract therefrom the points necessary for the calculation of the integrals, is performed in the manner shown in FIG. 12. Extraction firstly takes place of the points of the central cross A of centre $m$, then those of zones B, then those of zones C, etc. corresponding to:

| | |
|---|---|
| zone A : n = 0 | p = 0, 1, 2 … $p'_{max}$ |
| zone B : n = 1 | p = 1, 2, … |
| zone C : n = 2 | p = 2, … |

In this drawing, hatching has been used with the sole aim of making the zone stand out better. Phases $O_0$, $O_1$ and $O_2$ are assigned repsectively to:

the generation of addresses $x$, $y$ of memory M (in the drawings Adi represents all the address bits $x,y$);

the generation of addresses X, Y necessary for confirming the points in memories $m_V$ and $m_H$;

the generation of addresses X, Y necessary for confirming the points in memories $m_G$ and $m_D$.

In the drawings, X$di$ and Y$di$ represent all the address bits X and Y respectively.

The programme is as follows: Initially : X = Y = 1 $n = p = 0$ $I_G = I_D = I_H = I_V = 0$ no semaphore is placed (F$i$ = 0 whatever the value of $i$) and register 61 is not loaded, which is expressed by Q$i$ = 0.

The circuits are programed for random values of $n$ and $p$. With $n$ and $p$ fixed, the different addresses $x$, $x+n$, $x - (1 + n)$, $y$, $y + p$, etc. are compared at their limits 0 and 15.

Figure 9:
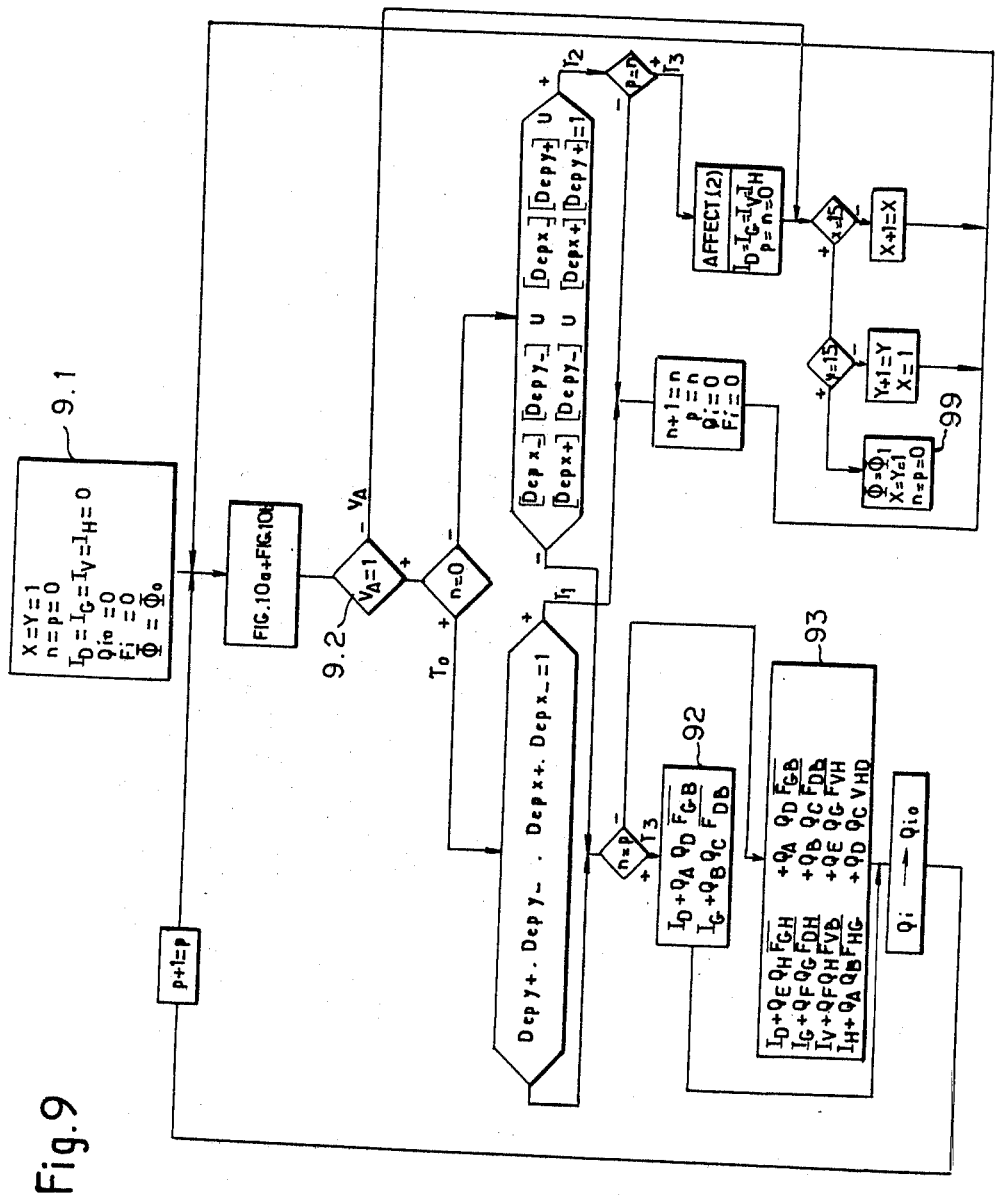
Figure 10A:
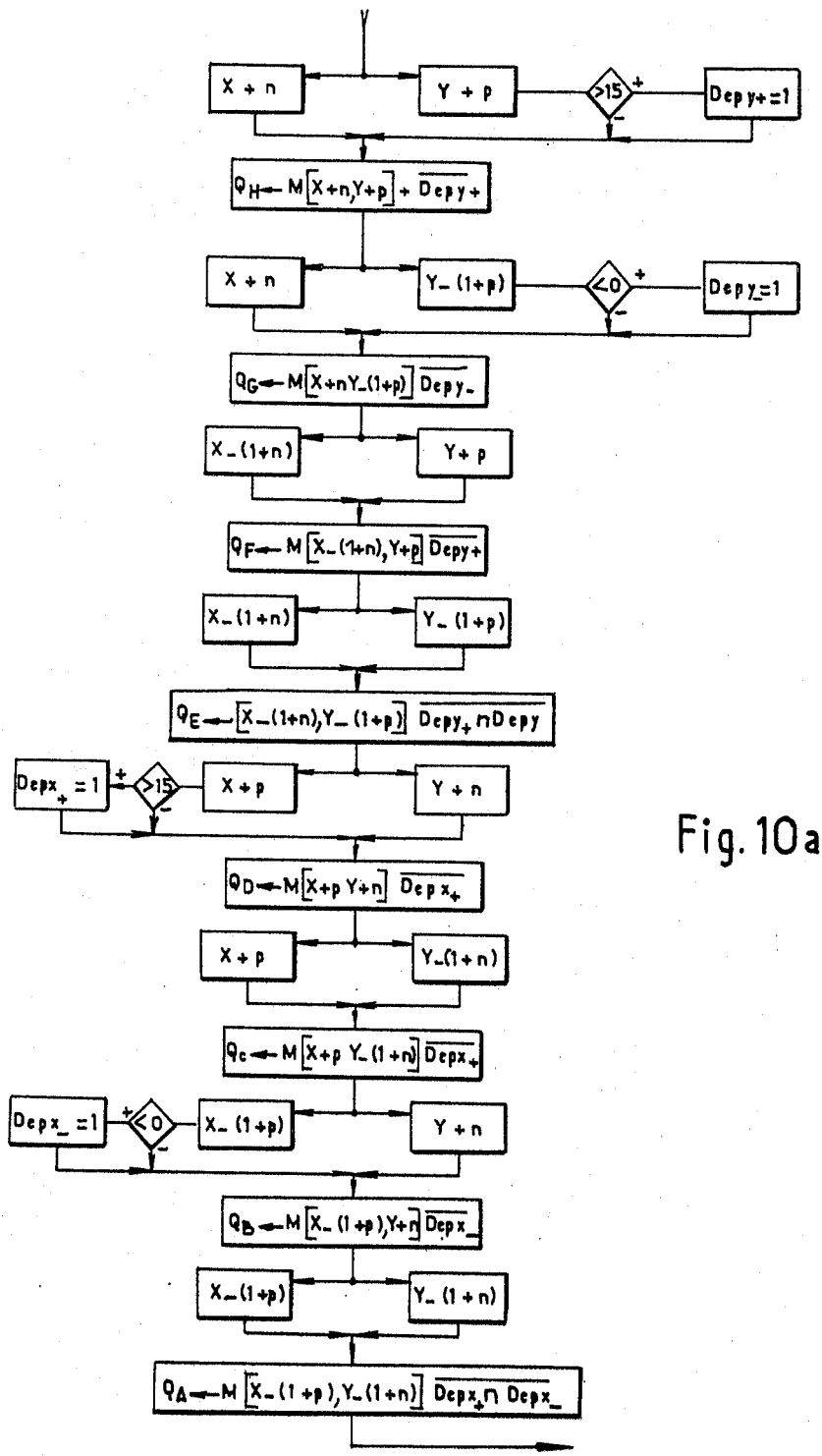
Figure 11A:
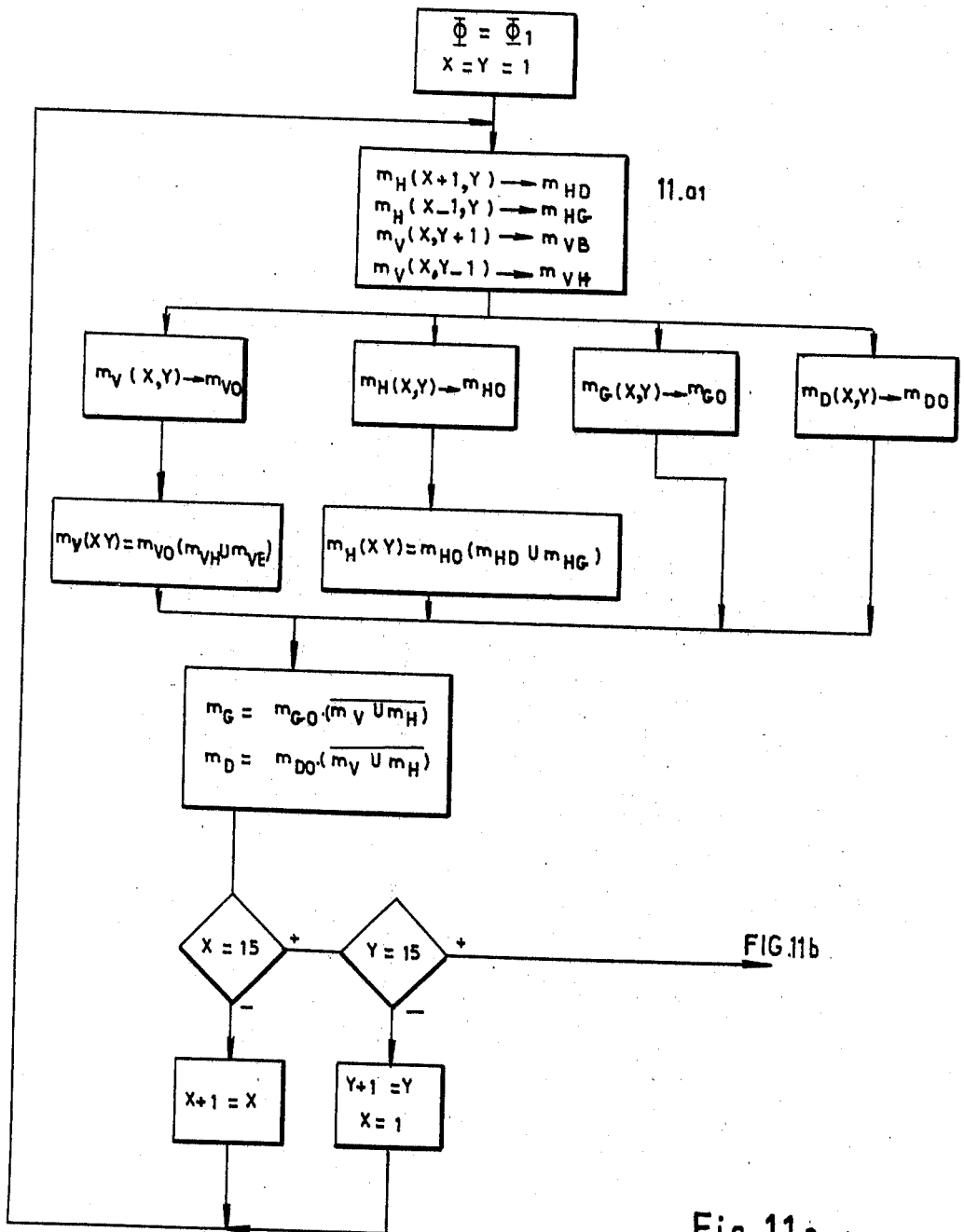
Figure 11B:
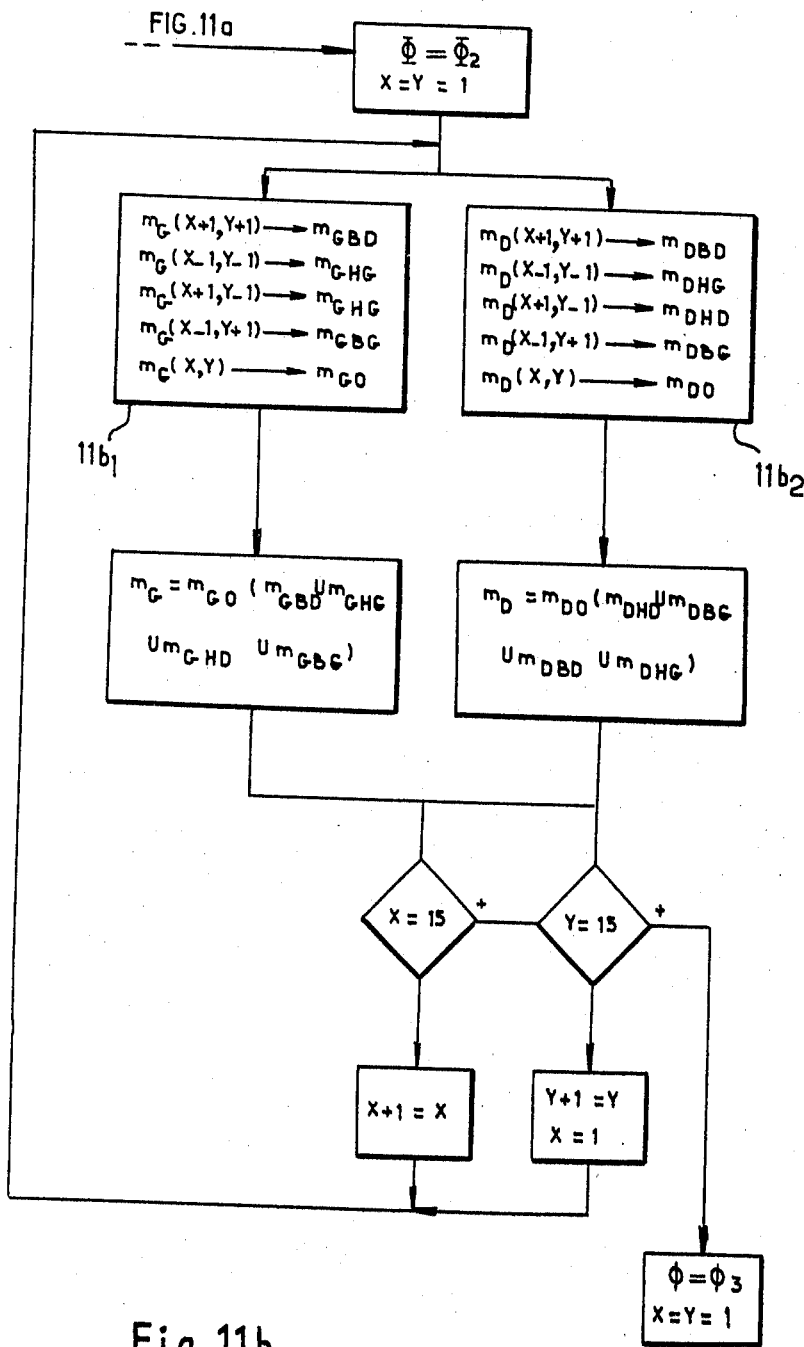

The initial conditions are given at 9.1 of the top of FIG. 9.

The subprogramme shown in FIGS. 10$a$ and 10$b$ (which together form FIG. 10) is performed for each value of $n$.

The symbols used for these flow charts are identical to those used in FIG. 7.

It is pointed out that the value X + $n$, X + $p$, X −(1 + N), etc. and Y + $n$, Y + $p$, etc. represent address values $x,y$.

The following designations are used:

Dep$x_+$, Dep$y_+$ = overflow by excess ($x > 15$ or $y > 15$)

Dep$x_+$, Dep$y_-$ = overflow by fault ($x > 0$ or $y > 0$).

The signal Dep is "1" if $x$ or $y$ exceed limits 0 or 15.

$T_0 = 1$ for $n = 0$.

$T_1 = 1$ if there is an overflow everywhere $T_2 = 1$ if there is at least one overflow on an address $x$ and an address $y$.

$T_3 = 1$ for $p = n$ $T_4 = 1$ for $p = 0$.

The signals $Q_A \ldots Q_H$ are the values available for the integrals. They indicated the existence or absence of an apex at the considered address $x$, $y$, defined in FIG. 10$a$.

The portion 10$a$ of flow chart 10 shows the logic acquisition operations of values $Q_A \ldots Q_H$.

The generation of the addresses $x$, $y$ necessary for their performance is described hereinafter with reference to FIG. 26.

The portion 10$b$ of this flow chart represents the calculation validation operation performed in logic 65 (FIG. 6); whereby signals $V_G$, $V_D$ express, when they are 1, that there is a validation of the calculations for a point located on a negatively inclined diagonal and a positively inclined diagonal respectively, signal V = 1 indicating that there are at least three points M belonging to a character around the previously considered apex, $m$ and the signal $V_A$ = 1 indicating that at least one of these signals has the value "1".

The signals $F_{\beta\gamma}(\beta\gamma=VB, VH$, etc.) are semaphores generated by the circuit 63. When $F_{\beta\gamma}=1$ the points located beyond the latter in the direction indicated by $\beta\gamma$ are not taken into consideration. The putting down of $F_{\beta\gamma}$ corresponds to cases similar illustrated in FIG. 8.

The abbreviations $\alpha\beta$ used indicate:

VB on the vertical line of the point and downwards;
VH on the vertical line and upwards;
HG on the horizontal line to the left;
HD on the horizontal line to the right;
GH on the negatively inclined diagonal upwards;
GB on the negatively inclined diagonal downwards;
DH on the positively inclined diagonal upwards;
DG on the positively inclined diagonal downwards.

The subprogramme of FIGS. 10 - 10$b$ is performed for as many times as is necessary to scan all the H, V, G, D passing through apex $m(1,1)$. When completed, this subprogramme recommences automatically for the next apex to the right on the same line and if the line is at an end for the abscissa apex 1 on the following line.

It starts with $n = p = 0$ (initial condition).

When it is at an end it recommences for $n = 0$, $p = 1$ then $p = 2$, etc., up to overflow (Depy$_+$ = 1).

Then it recommences at $n = 1, p = 1$, then $p = 2$, etc.

On the flow chart, this is expressed by $p+1 = p$, i.e. the new value of $p$ is equal to the previous one, increased by 1.

The designations $n + 1 = n$ and $X + 1 = X$ have the same meaning for $n$ and $x$ respectively.

The designations Q$i \rightarrow$ Q$io$ indicate that Q$i$ becomes the initial value Q$io$.

Q$i$ represents QA, QB . . . and the integrals $I_V$, $I_G$, $I_H$, $I_D$ are expressed by $$I_H = \sum_{0}^{p'_{max}} Q_A Q_B + Q_C Q_D \text{ for } n = 0$$

$$I_V = \sum_{0}^{p'_{max}} Q_E Q_G + Q_F Q_H \text{ for } n = 0$$

$$I_G = \sum_{n=0}^{n_{max}} \sum_{p=n}^{P_{max}} Q_E \cdot Q_H + Q_A \cdot Q_D$$

$$I_D = \sum_{n=0}^{n_{max}} \sum_{p=n}^{P_{max}} Q_F Q_G + Q_B \cdot Q_C$$

The flow chart of FIG. 9 shows the calculations performed in accordance with the flow chart of FIG. 10 to the calculation of the integrals, as indicated at 92 and 93.

On reaching 99, all the apices have been processed (because Y = 15 and X = 15). We then pass to the following phases $\Phi_1$ then $\Phi_2$, starting off again from the conditions X = Y = 1, $n = p = 0$ for the confirmation of the apices assigned to the memories $m\alpha$.

The apex confirmation operations are performed in accordance with the flow chart of FIG. 11$a$ for the apices of memories $m_V$ and $m_H$ and FIG. 11$b$ for those of $m_G$ and $m_D$.

These operations essentially consist of checking the presence of an adjacent apex on the segment retained.

Whilst referring to FIG. 1 for the meaning of X and Y, it can be seen that the addresses indicated in the portions to the left of rectangles 11$a_1$ and 11$b_1$, 11$b_2$ correspond to points located relative to address points X, Y in the direction designated by the abbreviations H,D (horizontal, right; etc.), whereby the symbol $m_{\alpha\beta}$ indicates a point in the memory $m\alpha$ located in the direction $\beta$ relative to point $m(X,Y)$ with $\beta$ = D to the right, $\beta$ = H upwards, etc and for the diagonals $\beta$ = HD downwards and to the right, $\beta$ = BG downwards and to the left, etc.

In memory M the character is characterized by a system of points $M(xy)$. The character is also characterized by a substantially equal number of apices $m(X,Y)$ distributed in the memories $m$ in accordance with the orientation of the character at the apex in question.

Thus, a memory $m\alpha$ contains all the points of the character belonging to segments with the same orientation. Thus, a memory $m\alpha$ also contains a system of segments with the same orientation of different addresses $m(X,Y)$, the segments of a memory $m\alpha$ being characterized by the same number of addresses as there are apices $m(X,Y)$ in which the character has the same orientation.

The number of the said data is then reduced by locating the segment of given type, but no longer by its address $m(X,Y)$, but by its address belonging to a given zone, all the segments of the same orientation located in the same zone representing a single piece of information, as is shown schematically in FIGS. 3a to 3d. A segment shown in this drawing corresponds to one or several segments of the same orientation, located anywhere in the same zone, all the segments of the same orientation located in the same zone give rise to a single binary information $\theta i$, in accordance with a basic principle of the invention.

The zonewise location of the segments necessitates the comparison of the addresses $m(X,Y)$ of the points of the memory $m\alpha$ with the addresses of the limits of the various zones. The circuit 55 of FIG. 5 serves to calculate these addresses and comprises the following stages:

(i) definition of the form, i.e. the rectangle in which the character is printed. This is obtained by projecting all the points constituting the character in the axes corresponding to the two addresses. This can be done from points $M(x,y)$ or $m(X,Y)$.

Figure 15:
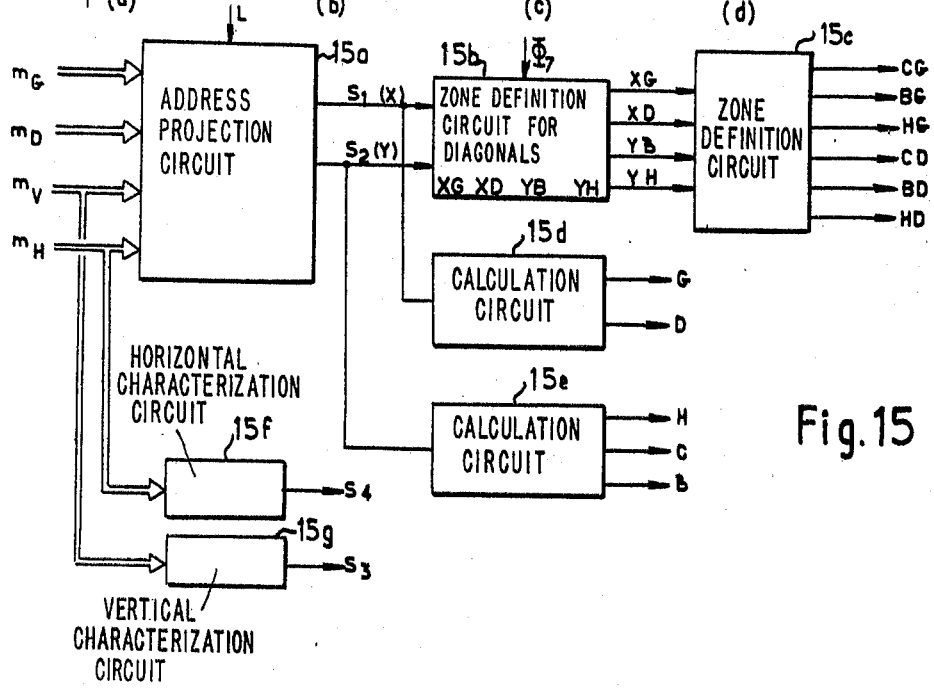
FIG. 15 is a block diagram of one of the circuits of FIG. 6.

The zone definition circuit shown in FIG. 15 operates on point $m(X,Y)$ available in the memories $m\alpha$.

A projection of the form (cf FIG. 13) determines:

the quantities $1_o$, $L_o$ defining the position of the character in the acquisition window, i.e. the minimum addresses X and Y at which there is at least one memory point $l$ in at least one of the memories $m\alpha$;

the quantities $l_1 + L_1$ and $l_o + L_o$ which are the maximum addresses X and Y at which there is at least one memory point 1 in at least one of the memories $m\alpha$.

(ii) definition of the zones within the form. In the case of the horizontal lines, it is considered that they are located at the top, in the centre or at the bottom, depending on whether their projections are located respectively in the spaces

| [L$_o$ | L$_o$ + 2[ |
| [L$_o$ + 2 | L$_o$ + L$_1$ − 2[ |
| ]L$_o$ + L$_1$ − 2 | L$_o$ + L$_1$] |

These spaces define the three zones Za, Zb, Zc, (shown at $a$ in FIG. 14) defining three parameters 17, 18, 19 (cf FIG. 3d) characterizing the horizontal ordinate segments Y, respectively defined by $$L_o \leq Y \leq L_o + 2$$
$$L_o + 2 \leq Y \leq L_o + L_1 - 2$$
$$L_o + L_1 - 2 \leq Y \leq L_o + 1$$

The diagonals are distributed along the X coordinates into two equal right-hand and left-hand zones ZD and ZG, depending on whether their addresses X are equal to or below XG or greater than XD, XG and XD being defined by $$X_G = E [2l_o + l_1]/2$$

$$X_D = E [2l_o + l_1]/2 + 1$$

in which E designates "whole portion of."

Along the Y coordinates, the diagonals are distributed into three zones ZH, ZB, ZC, corresponding to the Y addresses such that: for ZH : Y $\leq$ YH; for ZB : Y $\leq$ YB; for ZC : ZH $\leq$ Y $\leq$ YB where $YH = E\left(\dfrac{2 L_o + L_1}{2} - 3\right)$ and $YB = E\left(\dfrac{2 L_o + L_1}{2} + 3\right) + 1$ In the case of characters with a limited height ($L_1 <$ 10) only two equal zones are defined, giving $$\dfrac{2 L_o + L_1}{2} - 1 < YH = E\left(\dfrac{2 L_o + L_1}{2}\right) + 1$$

$$\dfrac{2 L_o + L_1}{2} + 1 > YB = E\left(\dfrac{2 L_o + L_1}{2}\right) + 1$$

The heights of the three zones defined for the diagonals when $L_1 \geq 10$ differ from those defined for the horizontal lines, as the central area of the diagonals is smaller.

In the general case ($L_1 > 10$), there are therefore six zones characterizing the diagonals, intersection of the zones ZH, ZB, ZC with the zones ZG, ZD defining the six parameters $\theta 1$, $\theta 6$ and $\theta 7$, $\theta 12$ in accordance with FIGS. 3a and 3b.

In the case of the vertical lines, it is considered that these are located to the left, to the centre or to the right, depending on whether the projections are located respectively in the spaces

Figure 14:
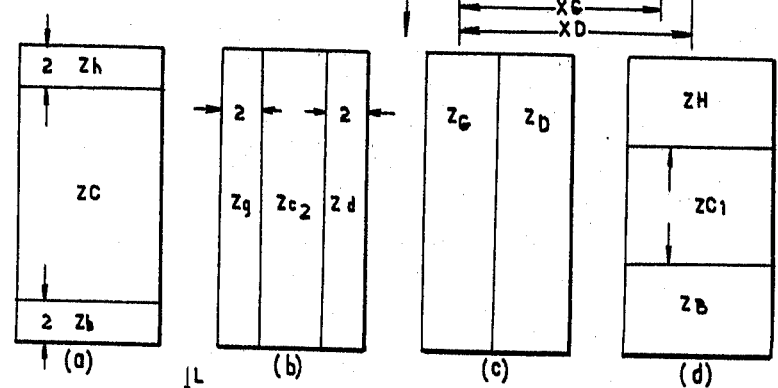

| [l$_o$ | l$_o$ + 2 [ |
| [l$_o$ + 2 | l$_o$ + l$_1$ − 2[ |
| ]l$_o$ + l$_1$ − 2 | l$_o$ + l$_1$] | defining the three zones Zg, Zc$_1$, Zd of FIG. 14 (b).

In the case of the vertical lines located in the zone Zg, i.e. whose address X is $10 \geq X \geq 10 + 2$, a distinction is made between the following zones: high ZgH, intersection of Zg and ZH, low ZfB, intersection of ZgB and ZB and centre, i.e. outside ZH and ZB, intersection of Zg and ZH·ZB. The parameters $\theta 15$, $\theta 16$ and $\theta 21$ respectively characterize the vertical lines of these zones.

The vertical lines located in the right-hand zone Zd are distributed only two groups, bottom and top, depending on whether or not they are located in ZH or ZB. The vertical lines which would be located to the right between ZH and ZB are not retained, because the parameter which would result from them is not necessary for determining the 64 alphanumerical characters, which are the only ones being considered here.

To simplify matters, hereinafter the zones are referred to by the following abbreviations, which are also used for the output signals of the calculating circuit for the zones. The abbreviations used have been selected on account of the logic combinations used for abbreviating the zone characterization signals.

Figure 13:
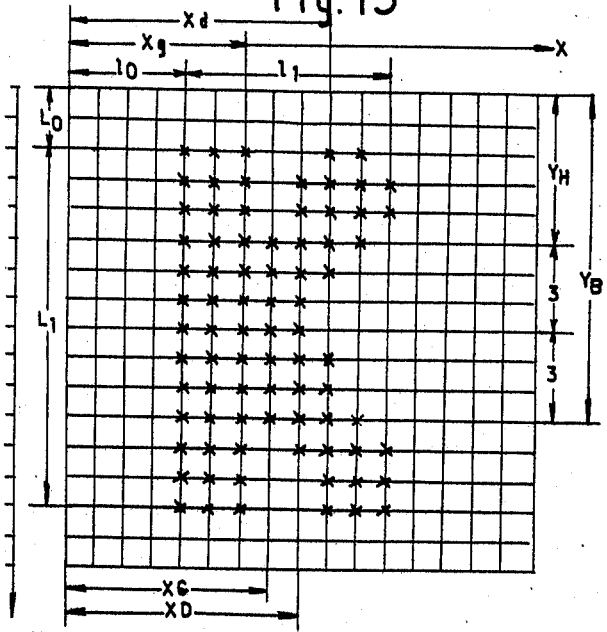
Figure 17:
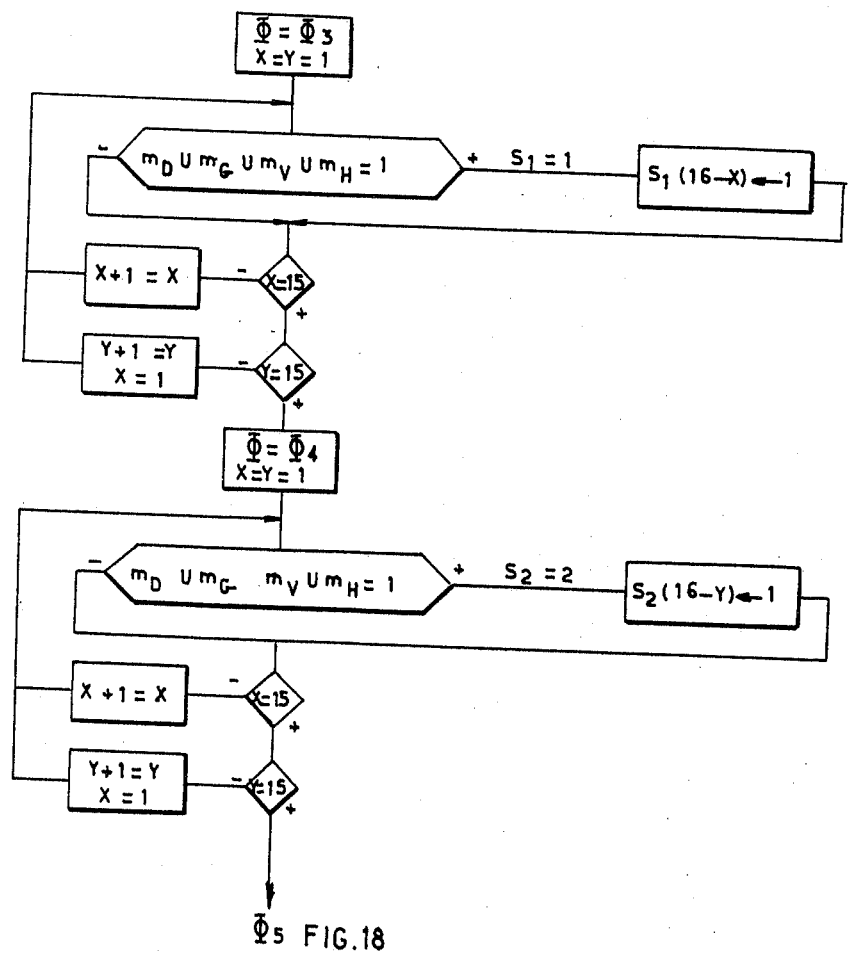
FIGS. 17, 18 and 19 together illustrate the flow chart of the circuit of FIG 16.
Figure 18:
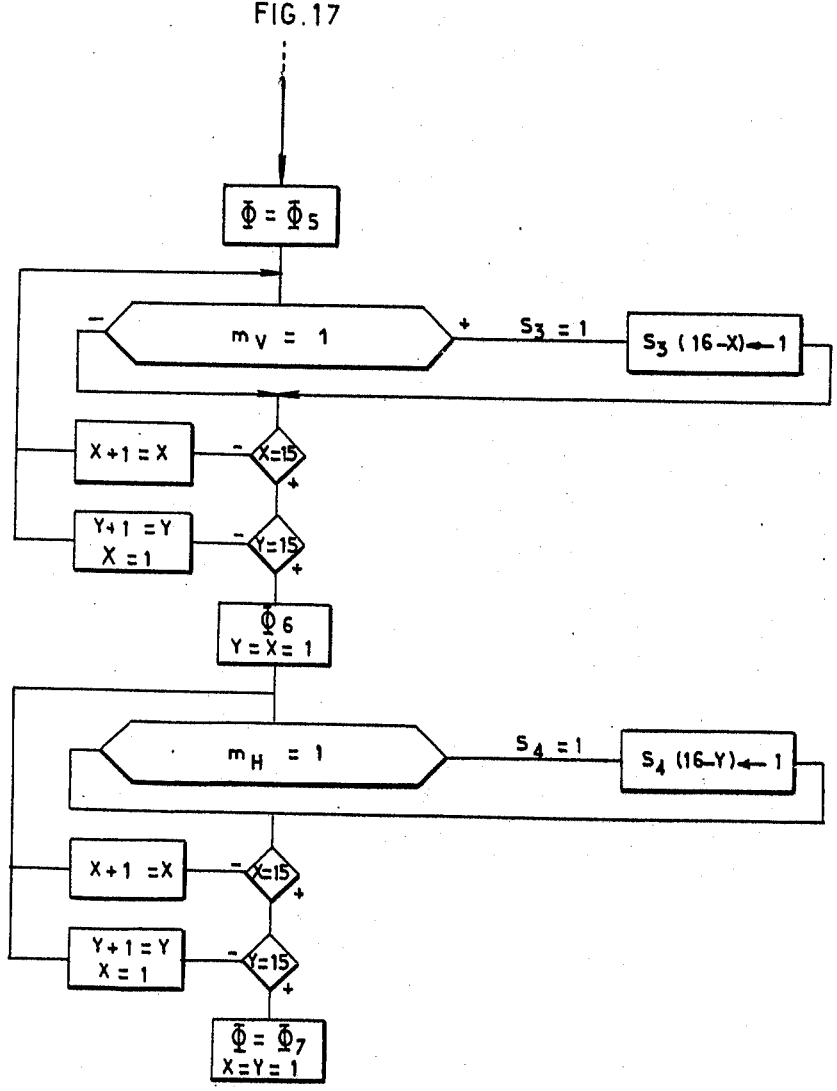
Figure 19:
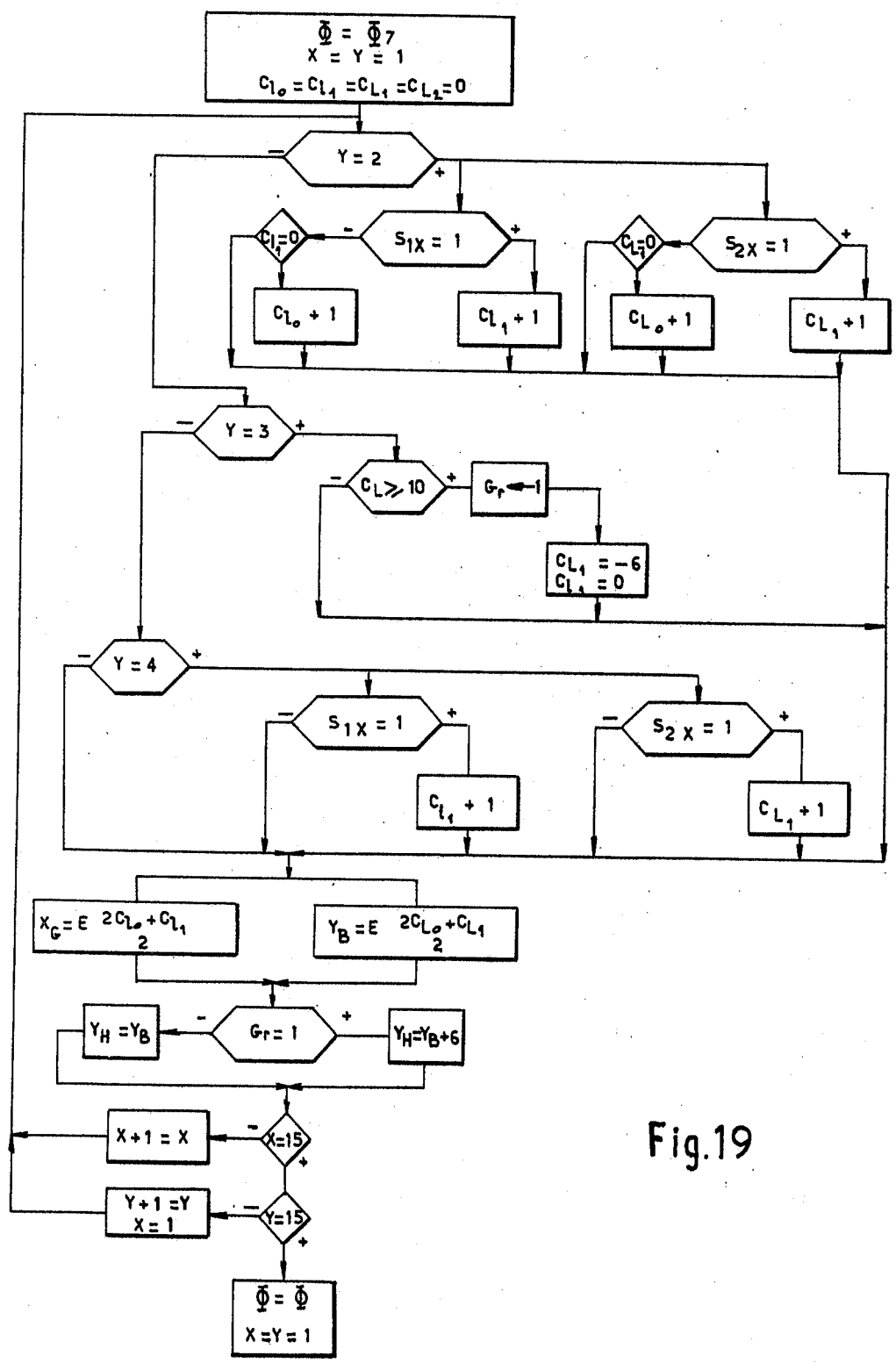

Horizontal lines:
H: zone Z$h$
C: zone Z$c$
B: zone Z$b$
Diagonals:

BG: intersection of zones ZB and ZG
BD: intersection of zones ZB and ZD
HG: intersection of zones ZH and ZG
HD: intersection of zones ZH and ZD
CG: intersection of zones ZC and ZG
CD: intersection of zones ZC and ZD Vertical lines:
G: zone Zg
D: zone Zd
$\overline{DG}$: zone $Zc_2$
G·HG: zone ZgH
G·BG: zone ZgB
D·HD: zone ZdH
D·BD: zone ZdB A circuit for calculating the zones, whose flow chart is shown in FIGS. 17, 18 and 19 substantially comprises, as shown in FIG. 15;

a circuit 15a for projecting all the addresses of points "1" of memories m on axes X and Y resepectively, whereby this circuit supplies signals S1 and S2;

a circuit 15b which, from S1 and S2, processes signals XG, YG, YB, YH, representative of the coordinates carrying the same reference, indicated in FIG. 13, and defining the characterization zones of the diagonals;

a logic 15c, which processes, from XG, YG, YB, YH, the signals CG, BG, HG, CD, BD, HD, defining the zones of the same references respectively;

calculation circuits 15d and 15e processing from signals S1 and S2 respectively, signals B, D and H, C, B;

the circuit also has two further circuits, 15f and 15g, for projecting horizontal lines on OY and vertical lines on OX, which processes the signals S4 and S3 respectively, to be used for the characterization of the horizontal and vertical lines.

Figure 16:
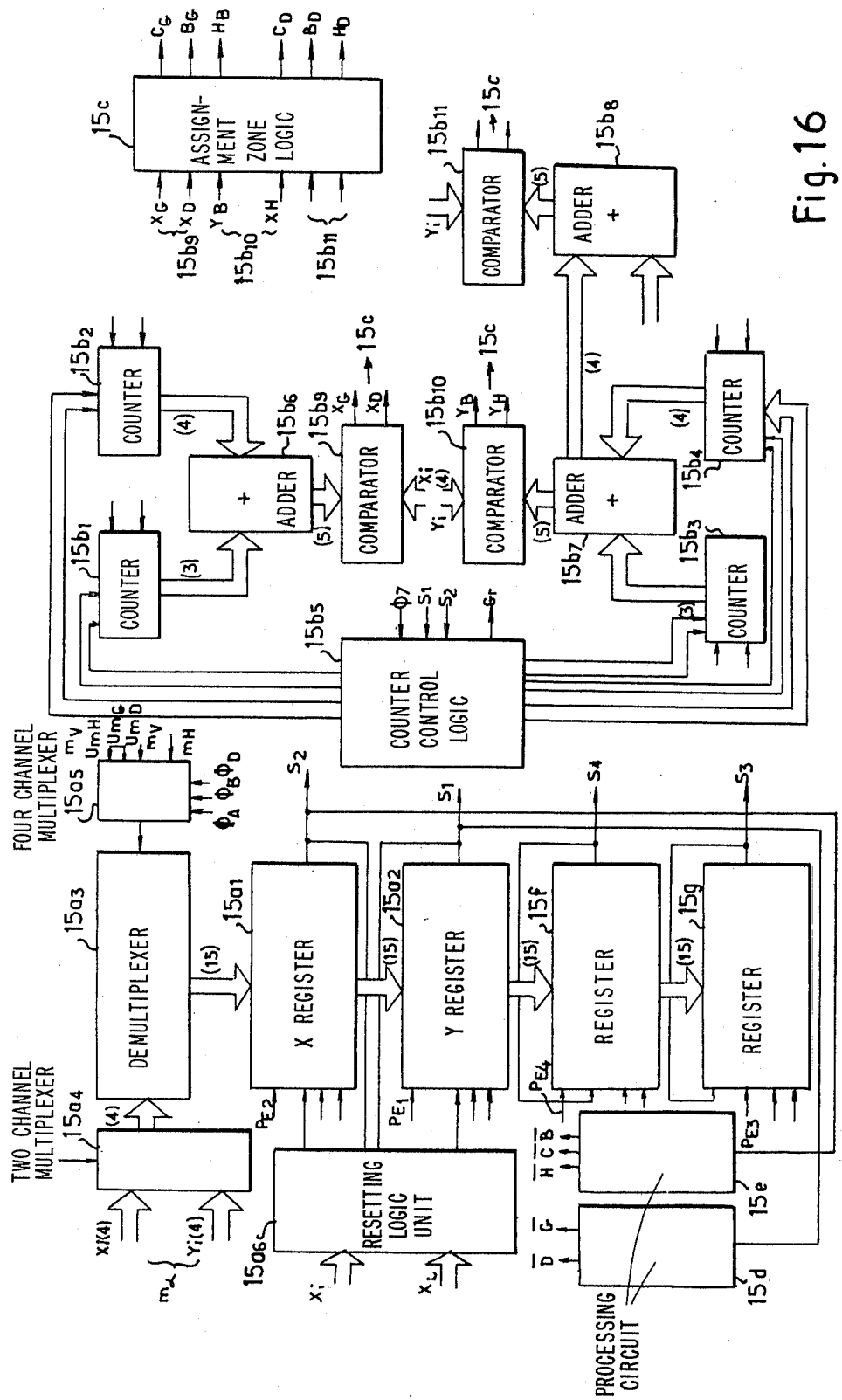
FIG. 16 illustrates a preferred embodiment of the circuit in FIG. 15.

According to a third embodiment of the invention shown in FIG. 16, the circuit for determining the form, whose flow chart is shown in FIG. 17, comprises two registers 15a1 and 15a2 respectively for X and Y with parallel accesses on which the 15 informations corresponding to the 15 values of X and Y are branched via a demultiplexer 15a3 addressed by Xi or Yi, depending on whether the projection is performed on OX or OY by means of a two-channel multiplexer 15a4 and by the memories via a four-channel multiplexer 15a5. This circuit also comprises a logic 15a6 for zero resetting at the end of the line and column.

The registers are synchronized by control logic L. The form is known and materialised in the registers after two memory read-outs, performed during phases Φ3 and Φ4 under the control of logic L.

Similarly, circuits 15f and 15g, whose flow chart is shown in FIG. 18, comprise parallel-parallel registers coupled respectively to memories $m_H$ and $m_V$ via demultiplexer 15a3 and synchronized by phase validation signals Φ4 and Φ5 respectively from logic L. The flow chart of circuit 15b is shown in FIG. 19 with the same signals as used hereinbefore. C10, C11, etc., indicate the count values of the counters of $l_0$, $l_1$, etc. Circuit 15b has four counters 15b1 and 15b2 for 10 and 11 respectively and 15b3 and 15b4 for $L_0$ and $L_1$ respectively, one logic 15b5 for controlling the counters, three adders, 15b6, 15b7, 15b8 and three comparators 15b9, 15b10 and 15b11. Besides adding, the adders carry out multiplications by 2 and divisions by 2. These operations are performed by shifting operations in the binary circuits, whereby the circuits are formed by simple adders.

The operation of the control logic 15b5 is determined during the phase signal Φ7. This logic:

on the one hand selectively authorises the incrementation of the counters of $l_0$ and $l_{11}$ (15b, 15b2) depending on whether or not there is a memory point 1 at the address X in question and the incrementation of the counters of $L_0$ and $L_1$ (15b3, 15b4) depending on the absence or presence of a point 1 at the address Y — to this end, logic 15b5 receives signals S2 and S3;

on the other hand, controls in synchronism the initial values of counter 15b4 and adder 15b8.

YB and YH can, in fact, be written in the form $$YH = E\tfrac{1}{2}[2L_0 + L_1 - \epsilon 6]$$

$$YB = E\tfrac{1}{2}[2L_0 + L_1 - \epsilon 6 + \epsilon 12] + 1$$

with $\epsilon = 0$ if $L_1 < 10$, and $\epsilon = 1$ if $L_1 \geq 10$.

As the adder 17b7 is connected to the outputs of the counter of $L_0$ (15b3) and of counter 15b4, logic 15b5 initially displays 0 or $-6$ in the latter depending on the value of $\epsilon$.

Adder 15b8 summates an internal display value with the output of adder 16b7.

Logic 15b5 displays 0 at 15b8 when $\epsilon = 0$ and $+12$ if $\epsilon = 1$.

Comparators 15b9, 15b10, and 15b11, which respectively receive the signal $(210 + l_1/2)$, $(2L_0 + L_1 - \epsilon 6/2)$, $(2L_0 + L_1 + \epsilon 6/2)$ from 15b7, 15b8 and 15b9, supply the whole useful sections represented by signals XG, XD, YB, YH. Logic 15c for processing the assignment zones of the diagonals supply signals CG = XG· $\overline{YB}$· $\overline{YH}$
CD = XD· $\overline{YB}$· $\overline{YH}$
HG = XG· YB
BD = XD, YB
HG = XG· YH
HD = XD· YH Circuits 15d, 15e, for processing signals H, C, B, G and D, function more simply from the projections of forms, which are advanced or delayed by two clock units of time. Each of the circuits 15d1, 15e1 comprises a double flip-flop and a NAND circuit 15d2, 15e2, in order to directly supply signals $\overline{D}$, $\overline{G}$, $\overline{H}$, $\overline{C}$, $\overline{B}$, which are more practical than the direct signals for producing the character characterization circuit, of which a preferred embodiment is illustrated.

The character characterization principle is simple, and substantially consists of testing the existence of various segments in the previously defined zones, e.g.:

$$Y=Y_H \quad X=X_G$$
$$\sum_{Y=1} \sum_{X=1} m_D(X,Y) = 1$$

shows that there is at least one positive diagonal at the bottom left of the character.

Thus, 21 tests are defined, whose positive response ($\theta i = 1$, where $i = 1$ to 21) denotes the existence of segments in accordance with the diagrams of FIGS. 3a to 3d.

Figure 20:
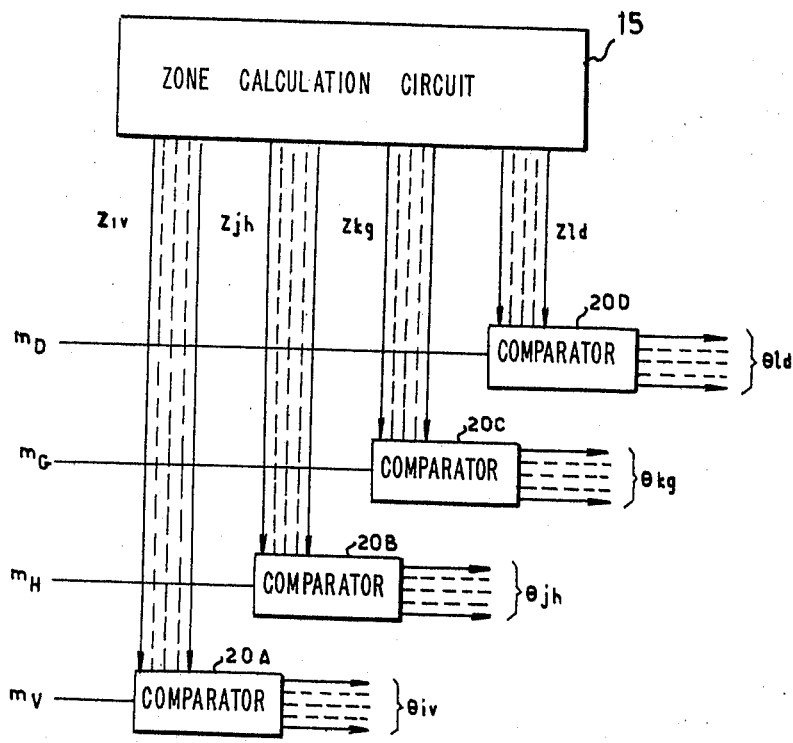
FIG. 20 is a simplified block diagram of one of the circuits of FIG. 6.

FIG. 20 shows the diagram of the character characterization circuit which can be most generally used, no matter what the number of zones defined. In FIG. 20, 15 designates the zone calculation circuit and Zi the signals characterizing the various zones, whereby Zij of one zone is single (a single address or coordinate) or double depending on whether it is one of the zones such as H, B, C or one of the zones such as BG, BD, etc. in the case of zone HG the signal $Zij$ comprises signals YH and XG.

The following abbreviations have been used in the drawing:

$Ziv$ for the assignment zones for the vertical lines and more generally $i \leq$ number of assignment zones for the vertical lines;

$ZjH$ the assignment zones for the horizontal lines;

$Zkd$ the assignment zones for the positively inclined diagonals;

$Zld$ the assignment zones for the negatively inclined diagonals.

In the case of alphanumerical characters:

$Zkd = Zld$ with $k = 1 \leq 6$; and $i = 6$ and $j = 3$.

The addresses of points 1 of the memories are compared respectively at 20A, 20B, 20C, 20D with signals $ZiV$, $ZiH$, $Zkg$ and $Zld$, whereby each comparison determines the corresponding variables, i.e. $\theta jH$ for the horizontal lines, $\theta iV$ for the vertical lines, etc. with $\theta 1d = \theta 1$ to $\theta 6$, $\theta kg = \theta 7$ to $\theta 12$, $\theta jH = \theta 17$ to $\theta 19$ and $\theta iV = \theta 13$ to $\theta 16$ and $\theta 20$, $\theta 21$, in the example considered hereinbefore.

Figure 21:
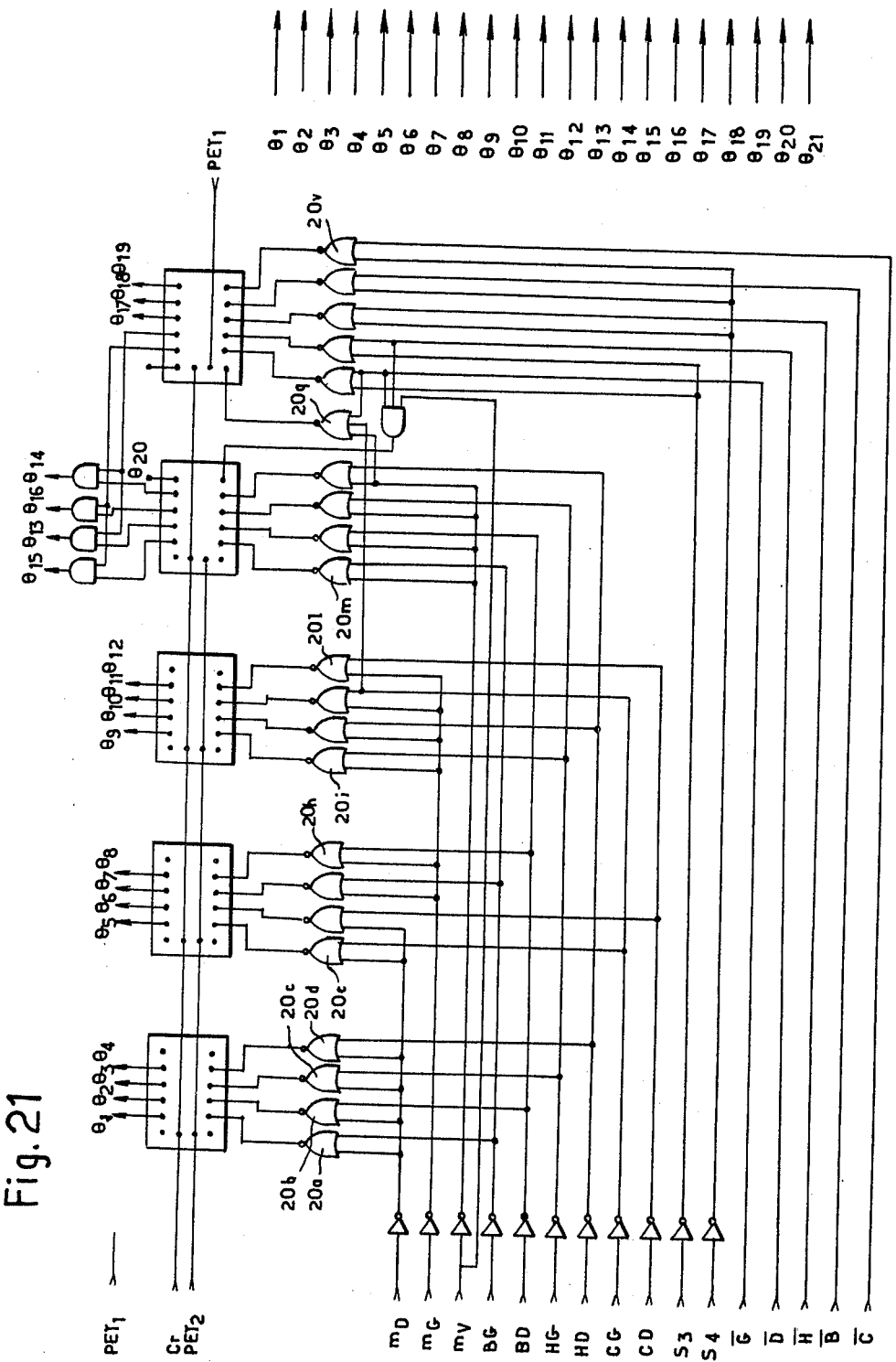
FIG. 21 illustrates an embodiment of the circuit of FIG. 20.
Figure 22:
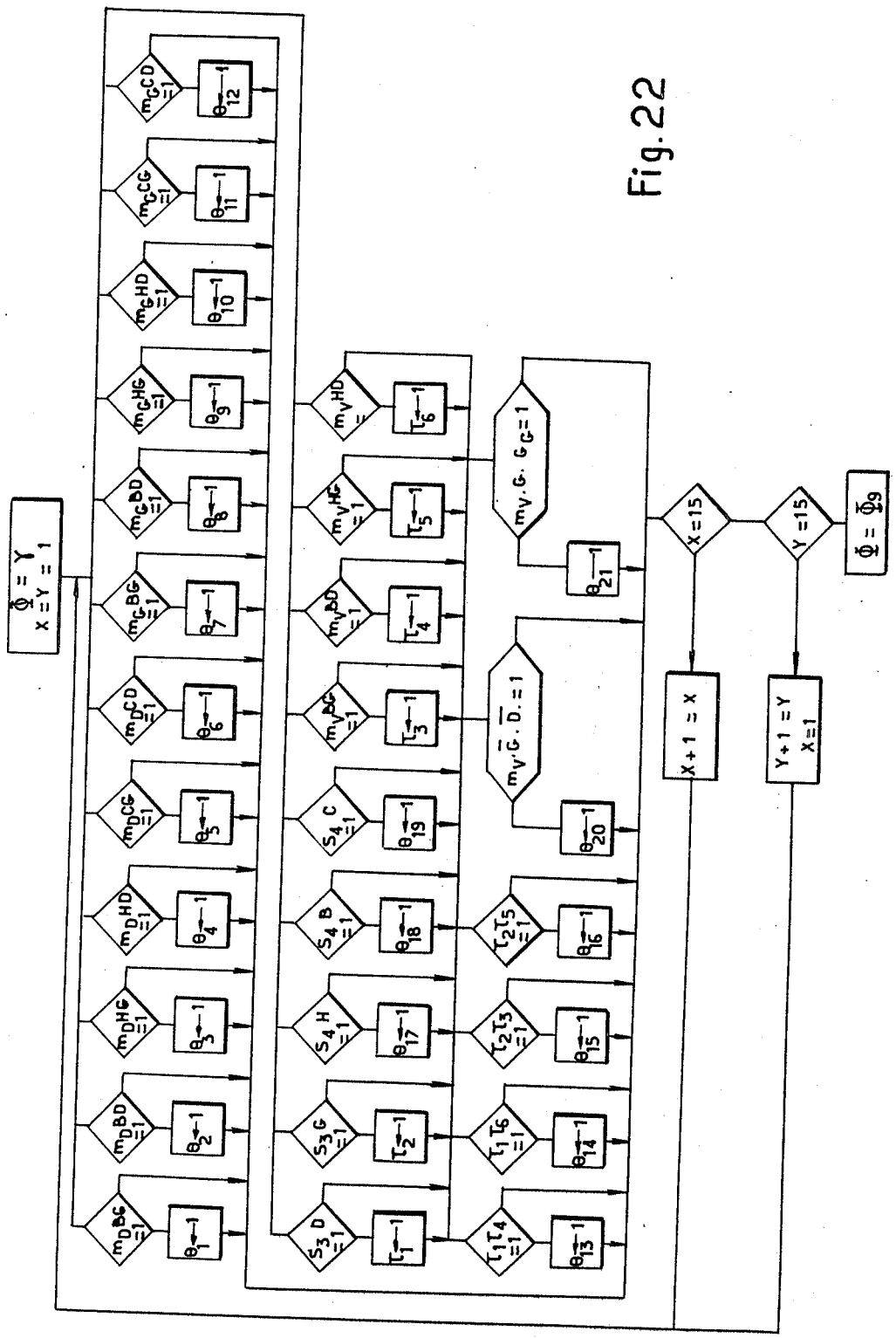
FIG. 22 is a flow chart of the circuit of FIG. 21.

FIG. 21 is a preferred embodiment of the characterization circuit according to the invention and FIG. 22 is the assignment flow chart relative to the circuit of FIG. 21. In this case, zones $Zkg$ and $Zld$ are identical and the horizontal lines are characterized solely by their address Y and the characterization signals of the zones are signals available at the outputs of the circuit of FIG. 16, i.e. CG, CD, BG, BD, HG, HD, $\overline{H}$, $\overline{C}$, $\overline{B}$, $\overline{D}$ and $\overline{G}$, and where S3 and S4 are projections of the vertical lines on OX and the horizontal lines on OY.

The circuit of FIG. 21 is produced in negative logic form, the technology of these circuits being simpler than that of the direct logic circuit. To make the operation of these circuits more readily comprehensible, it is pointed out that the parameters $a$, $b$, $c$ represent random variables, $\overline{a} + \overline{b} + \overline{c} = a\,b\,c$, the sums and products obviously being logic products and sums.

In these conditions, the various logic circuits effectively express the intersections of the addresses of memory points $m \alpha 1$ with those of the zones in question.

A zone signal with a line over the top indicates that reference is being made to points of memory $m\,\alpha$, whose addresses are outside those of the limits of the zones in question.

The output signals of the logic comparison circuits 20 to 20V load 5 parallel-parallel registers 31 to 35, serving as the memory, whose outputs are synchronized by control logic L.

Parameters $\theta 1$ to $\theta 12$ (positively inclined and negatively inclined diagonals) are directly determined by logic circuits 20a to 20l.

Parameters $\theta 17$, $\theta 18$ and $\theta 19$ (horizontal lines) as well as parameters $\theta 21$ (vertical line in the centre) are also directly determined by the logic circuits 20t, 20u, 20v and 20q.

For determining the parameters $\theta 13$ to $\theta 16$, six intermediate parameters $\gamma 1$ to $\gamma 6$ are processed in NOR circuits 20s, 20r, 20m, 20n, 20o and 20p with the following relationships:

$\gamma 1 = S3.D$
$\gamma 2 = S3.G$
$\gamma 3 = mv.BG$
$\gamma 4 = mv.BD$
$\gamma 5 = mv.HG$
$\gamma 6 = mv.HD$ Four AND gates are connected to the outputs of registers 34 and 35 to which are transferred parameters $\gamma 1$ to $\gamma 6$ in such a way as to supply the parameters:

$\theta 13 = \gamma 4. \gamma 1 = mv\,D.BD$
$\theta 14 = \gamma 6. \gamma 1 = mv\,D.HD$
$\theta 15 = \gamma 3. \gamma 2 = mv\,G.BG$
$\theta 16 = \gamma 5. \gamma 2 = mv\,G.HG$ (in the above relationships, S3 has been eliminated because the address X of the vertical lines is included in the system of addresses X, Y thereof).

At the end of the phase $\Phi 8$, the 21 variables $\theta i$ are determined and the control logic transmits the decoding circuit validation signal $\Phi 9$, representing the final stage of the recognition process.

This final stage, i.e. the actual recognition constituted by the decoding of variables $\theta i$, will vary in complexity depending on the nature and number of characters liable to be recognised, in other words depending on the number of combinations of variables $\theta i$ necessary for the identification of a character, taking account of the numerous possible variants of the system of points M(xy) of one and the same character, due in particular to phase effects during sampling, i.e. parasitic quantification actions.

Figure 23:
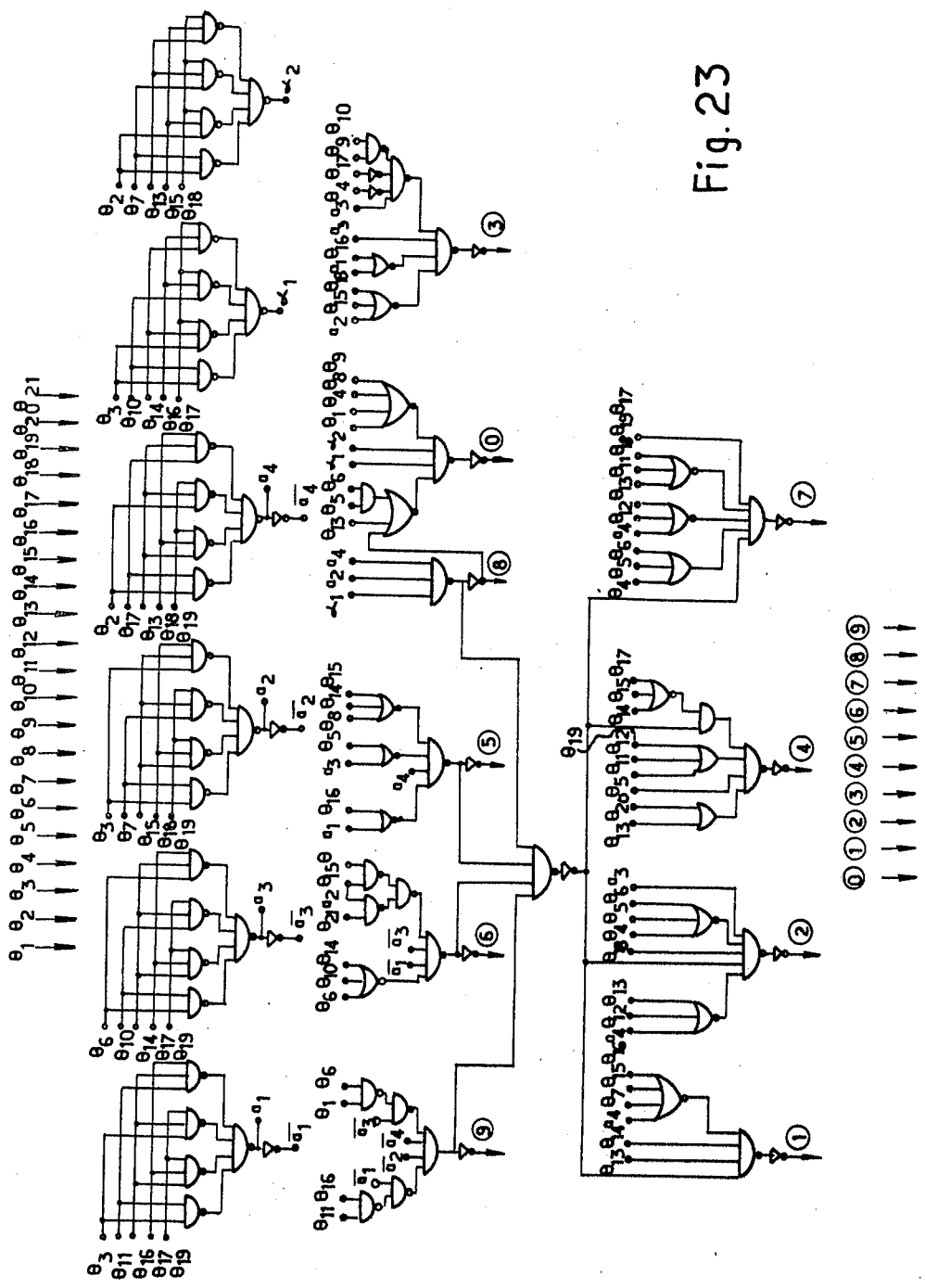
FIG. 23 shows an embodiment of one of the circuits of FIG. 16.

The circuit of FIG. 23 is a mainly negative logic form of the decoding circuit of the 10 digits 0 to 9.

At its 21 inputs, the decoder receives the 21 binary variables $\theta 1$ to $\theta 21$ and supplies at 10 outputs, 10 mutually exclusive binary variables, called 0, 1, 2 . . . 9. These variables can be applied to any system using binary input, for example they can be used to energise a decimal display device comprising nixie tubes.

This decoding principle is applicable to the decoding of all the alphanumeric characters. It constitutes a hierarchical decoding based on the physical significance of the variables.

Figure 24A:
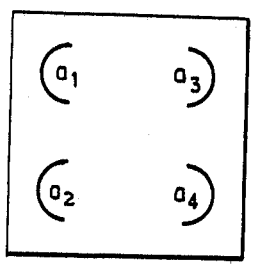
FIGS. 24a and 24b are explanatory diagrams.
Figure 24B:
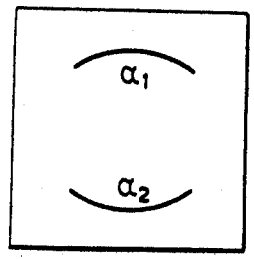
Figure 25:
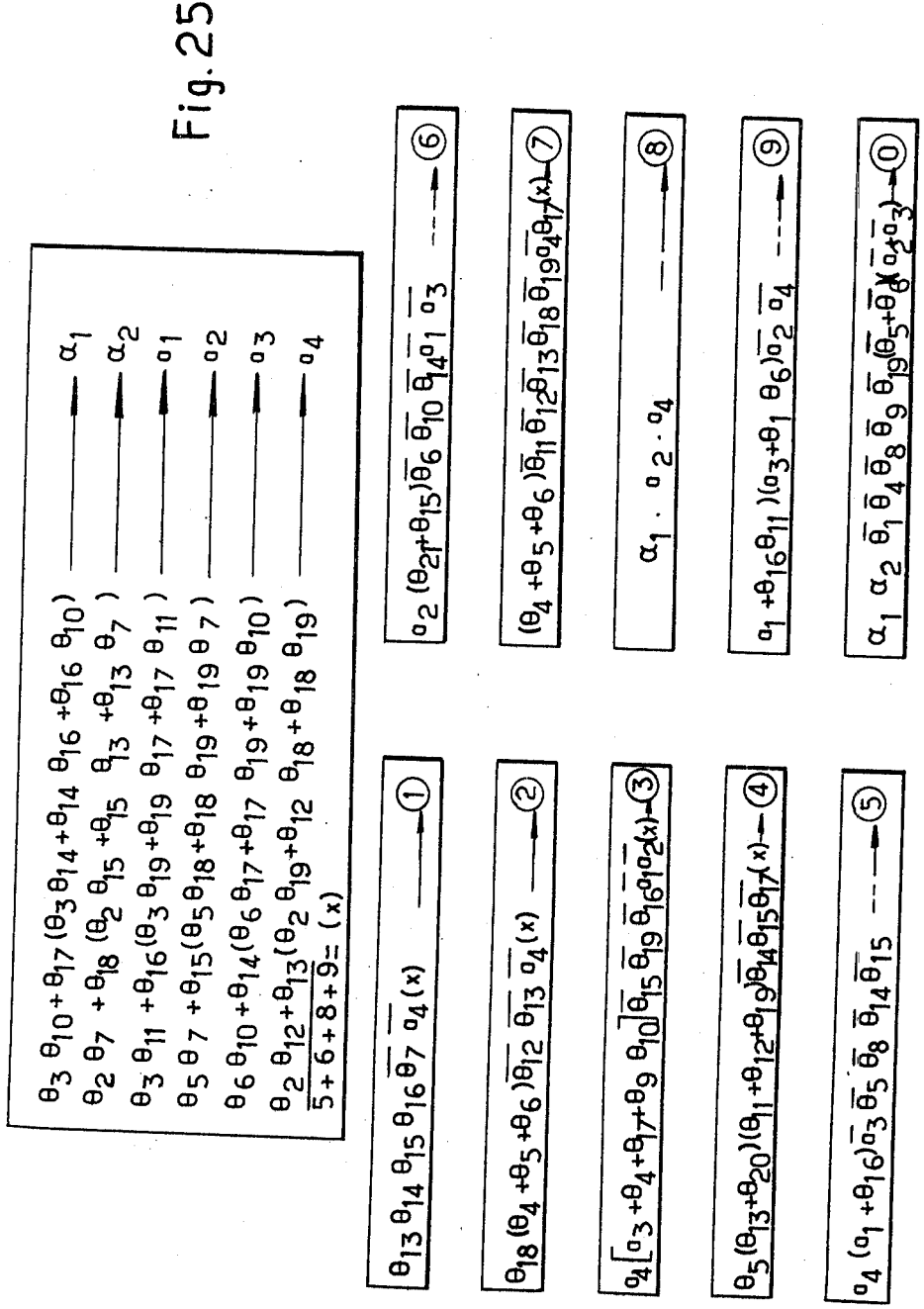
FIG. 25 is the flow chart of the circuit of FIG. 23.

In the case of digits 5, 6, 8, 9, 0, it is proved advantageous to process six intermediate variables $a1$, $a2$, $a3$, $a4$ and $\alpha 1$, $\alpha 2$, whose value 1 denotes the existence of shape and position curves as shown in FIGS. 24a and 24b with the same references, curves $a1$ to $a4$ being relatively closed curves and curves $\alpha 1$, $\alpha 2$ being very open curves. Digits 1, 2, 3, 4 and 7 are substantially decoded from variables $\theta i$, variables $a1$ to $a4$, $\alpha 1$, $\alpha 2$ only being involved in exclusive form. The logic combinations characterizing digits 0 to 9 and used in the circuit of FIG. 23 are shown in the table of FIG. 25.

The respective recognition of the various digits is determined by the presence or absence of the segments and curves indicated hereinafter by the reference of the corresponding parameter.

Digit 0:
    presence of $\alpha 1$ and $\alpha 2$
    absence of $\theta 1$, $\theta 4$, $\theta 8$, $\theta 9$, $\theta 19$
    absence of the combination determining the digit 8
    absence of at least one of $\theta 5$ and $\theta 6$ Digit 1:
    presence of $\theta 13$ and $\theta 14$
    absence of $a4$, $\theta 7$, $\theta 15$, $\theta 16$
    absence of the combinations corresponding to digits 5, 6, 8 and 9

Digit 2:
    presence of $\theta 18$
    presence of at least one of $\theta 4$, $\theta 5$, $\theta 6$
    absence of $\theta 12$, $\theta 13$, $\theta 14$
    absence of combinations defining digits 5, 6, 8 and 9

Digit 3:
    presence of $a4$ presence of at least one of $a3$, $\theta4$, $\theta17$ and/or $\theta9$, $\theta10$ together
absence of $a1$, $a2$, $\theta15$, $\theta16$, $\theta19$ Digit 4:
presence of $\theta5$
presence of at least one of $\theta13$ and $\theta20$
presence of at least one of $\theta11$, $\theta12$, $\theta19$
absence of $\theta14$, $\theta15$, $\theta17$
absence of the combinations corresponding to digits 5, 6, 8 and 9

Digit 5:
presence of $a4$
presence of at least one of $a1$ and $\theta16$
absence of $a3$, $\theta5$, $\theta8$, $\theta14$, $\theta15$ Digit 6:
presence of $a2$
presence of at least one of $\theta21$ and $\theta15$
absence of $\theta6$, $\theta10$, $\theta14$, $a1$, $a3$ Digit 7:
presence of $\theta17$
presence of at least one of $\theta4$, $\theta5$, $\theta6$
absence of $a4$, $\theta12$, $\theta13$, $\theta11$, $\theta18$, $\theta19$ and the combinations defining digits 5, 6, 8 and 9

Digit 8:
presence of $\alpha1$, $a2$, $a4$

Digit 9:
presence of $a1$ and/or $\theta11$, $\theta16$ together
presence of $a3$ and/or $\theta1$, $\theta6$ together
absence of $a2$ and $a4$.

Arcs $a1$, $a2$, $a3$, $a4$, $\alpha1$ and $\alpha2$ are characterized respectively by:

a1: simultaneous presence of at least one of the groups $\theta3$ and $\theta11$- $\theta3$, $\theta16$ and $\theta19$ - $\theta11$, $\theta16$ and $\theta17$ - $\theta16$, $\theta17$ and $\theta19$ a2: simultaneous presence of the parameters of at least one of the groups: $\theta5$ and $\theta7$ - $\theta5$, $\theta15$, $\theta18$ -$\theta7$, $\theta15$ and $\theta19$ - $\theta15$, $\theta18$ and $\theta19$ a3: simultaneous presence of at least one of the groups $\theta14$, $\theta17$, $\theta19$ - $\theta10$, $\theta14$, $\theta19$ - $\theta14$, $\theta17$, $\theta6$ and $\theta6$, $\theta10$ a4: simultaneous presence of the parameters of at least one of the groups $\theta2$, $\theta12$ - $\theta13$, $\theta18$ and $\theta19$ - $\theta2$, $\theta13$ and $\theta19$ - $\theta12$, $\theta13$ and $\theta18$ $\alpha1$: simultaneous presence of the parameters of at least one of the groups $\theta3$, $\theta10$ - $\theta17$, $\theta3$ and $\theta14$ - $\theta17$, $\theta14$ and $\theta16$ - $\theta17$, $\theta16$ and $\theta10$ $\alpha2$: simultaneous presence of the parameters of at least one of the groups $\theta2$, $\theta7$ - $\theta18$, $\theta15$ and $\theta2$ - $\theta18$, $\theta15$ and $\theta13$ - $\theta18$, $\theta13$ amd $\theta7$.

The segment separation and assignment circuits, the pattern zone characterization circuits, the segment location circuits and the decoding circuits described hereinbefore, form the essential parts of the apparatus. Their operation involves the use of auxiliary circuits shown as 52, 54 and L in FIG. 5, i.e. address generators for memories M and $m\alpha$ and a general control logic whose function is to ensure the automatic operation of the system, whilst synchronizing the various operations in such a way that they are distributed in time with a time lag which is sufficient to ensure that the switching of a circuit does not introduce unwanted signals into another circuit leading to false information, but still as short as permitted by the characteristics of the components used.

The address generators and control logic are entirely defined by their functions and can be constructed in per se known manner.

Figure 8:
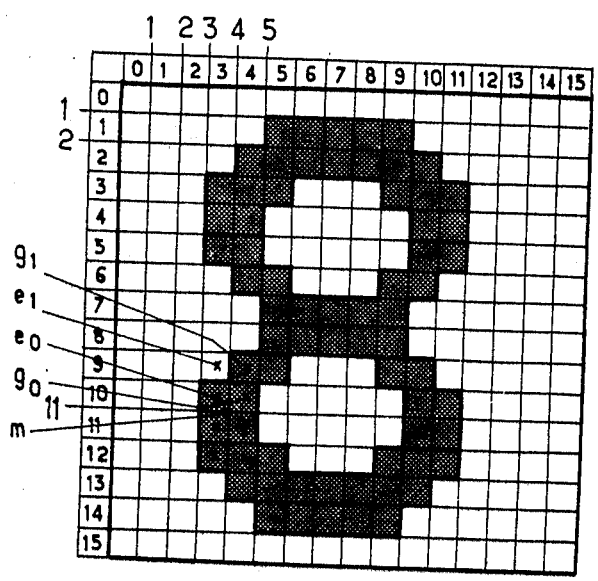
FIG. 8 is an explanatory diagram.
Figure 26:
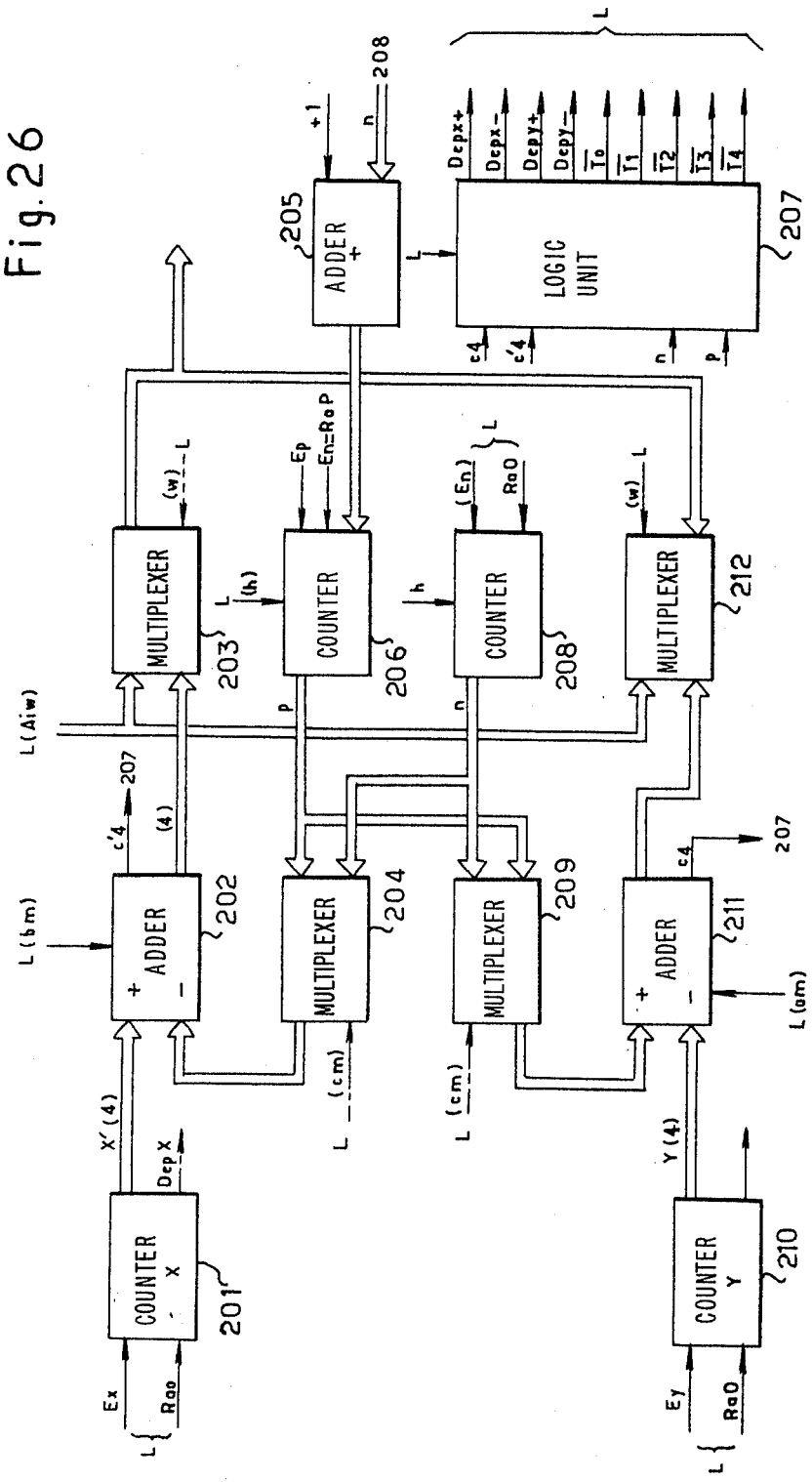
FIGS. 26, 27 and 28 are block diagrams of the circuits of FIG. 6.
Figure 27:
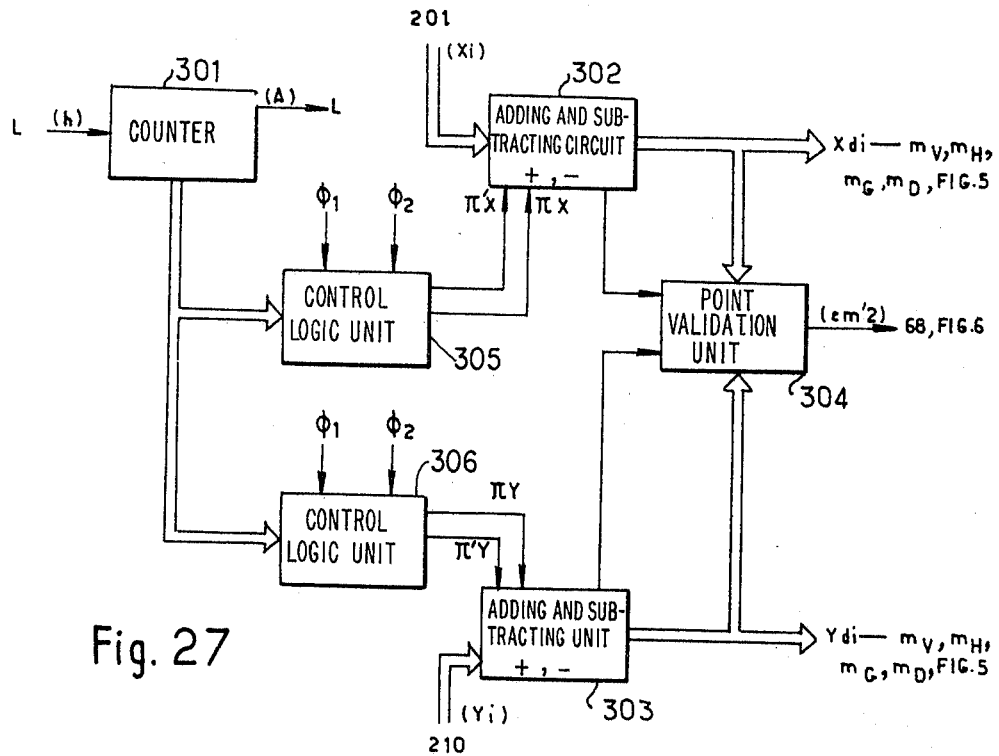

FIGS. 26 and 27 are synoptic diagrams of preferred embodiments of these generators, particularly suitable for the flow charts of FIGS. 9 and 10 on the one hand and FIG. 11 on the other, FIG. 8 is the basic diagram of a preferred control logic.

The functions of address generator M shown in FIG. 26 are:
performing the addressing of memory M for putting into effect the segment extraction circuits:
to transmit an external address during the loading of the said memory.

Thus, this generator must process eight pairs of addresses $x = Y + n; y = Y + p$ $x = X + n; y = Y - (1 + p)$, etc. defined hereinbefore, for the calculation of integrals $I_V$, $I_H$, $I_G$, $I_D$.

The quantities $x$, $y$, $n$ and $p$ are available respectively at the output of counters 201, 210, 206 and 208, whose incrementation and resetting to the initial value (zero for the counter of $n$, 208, and $n$ for the counter of p, 206) are governed by logic L, according to the results of overflow tests carried out on the addresses by a test processing logic 207 which compares the last values of $x$ and $y$ obtained with the limit values 0 and 16. Logic 207 receives the values $n$ and $p$ from counters 206 and 208 and the carry over indications $c4$, $c'4$ from adders 202, 211. It processes the signals $Depx_+$, $Depy_+$, $Depx_-$, $Depy_-$ and the signals T0, T1, T2, T3 and T4 defined on flow chart 9.

In FIG. 26, EX, EY, $Zp$, $En$ designate the respective incrementation signals of the counters and $Ra$ indicates the resetting to the initial value of the indicated variable.

The new addresses $x$ and $y$ are processed at all times from the preceeding values of X and Y by adding or subtracting in 202 and 211 and multiplexing of $n$ and $p$ in 204 and 211, depending on the orders received from logic L, in accordance with the flow chart of FIG. 10.

A final multiplexing, respectively in 203 and 212, makes it possible to address the memory either by output quantities from circuits 202 and 211 or by addresses A$iw$ from the acquisition system, whereby A$di$ represents a random address $x$, $y$ from memory M.

The address generator $m$ must supply the address (X, Y) from the point $m$(X,Y) (FIG. 1) for storing the point and addresses X + 1, Y; X − 1, Y; X, Y − 1; X, Y + 1, for confirming the points in stores $m_H$ and $m_V$, and the addresses: X + 1, Y + 1; X − 1, Y − 1; X + 1, Y − 1; X − 1, Y + 1, for confirming the points in memories $m_G$ and $m_D$.

These addresses are processed from X and Y supplied by counters 201 and 210 (common to address generators $m$ and M) by adding and subtracting 1 or 0 by circuits 302 and 303. The operations are synchronized by control logics 305 and 306, themselves governed by a counter 301 which has 5 states, in accordance with the flow chart of FIG. 11. This counter is inoperative at state 4 for which the output addresses X$di$ and Y$di$ are equal to X and Y.

A memory point validation logic 304 assigns the value 0 to the points whose address locates them outside memory $m$.

The control logic L ensures the successive performance of the operations described hereinbefore in accordance with the ten phases $\Phi0$ to $\Phi9$ per memory:
three phases $\Phi0$, $\Phi1$, $\Phi2$ for separating the segments;
five phases $\Phi3$ to $\Phi7$ for calculating the zones;
one phase $\Phi8$ for characterizing the character;
one phase $\Phi9$ for decoding.

It is entirely defined by functions which are the generation of various control signals from the various processors described, namely:

address incrementation orders for processing addresses in address generator M (FIG. 26): orders EX, EY, E$p$, E$n$;

control orders $a_m$, $b_m$, $c_m$ of the circuits of address generator M;

orders for resetting to the initial value of the addresses: RaX, RaY, Ran (the order Rap being identical to E$n$ because $p \geq n$);

print-out orders of memory registers 63, 64 of the segment separation processor (FIG. 6): $hr_\sigma$, $f_P$, $h_V$ and their resetting to zero RaOH; RaoQi:

print-out orders of memories M: WM;

print-out orders of memories $m$;

print-out orders of the projection memories of the zone calculation processor (FIG. 16): PE1 - PE2 - PE3 - PE4;

print-out orders of the test memories of the character characterization processor (FIG. 21): PET1, PET2;

validation signals of the various operating phases, these signals being designated by the same references Φ0 ... Φ9 as the phases which they define.

Logic L also has initialisation circuits which cooperate in the processing of print-out orders WM of memory M and the zero resetting of all the counters and memories, as a function of data received from the acquisition system.

Figure 28:
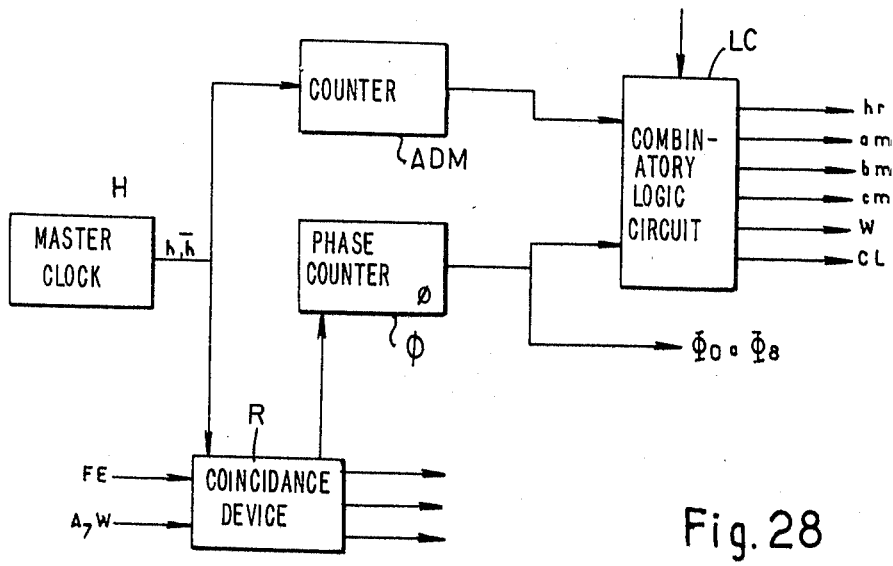
Figure 29:
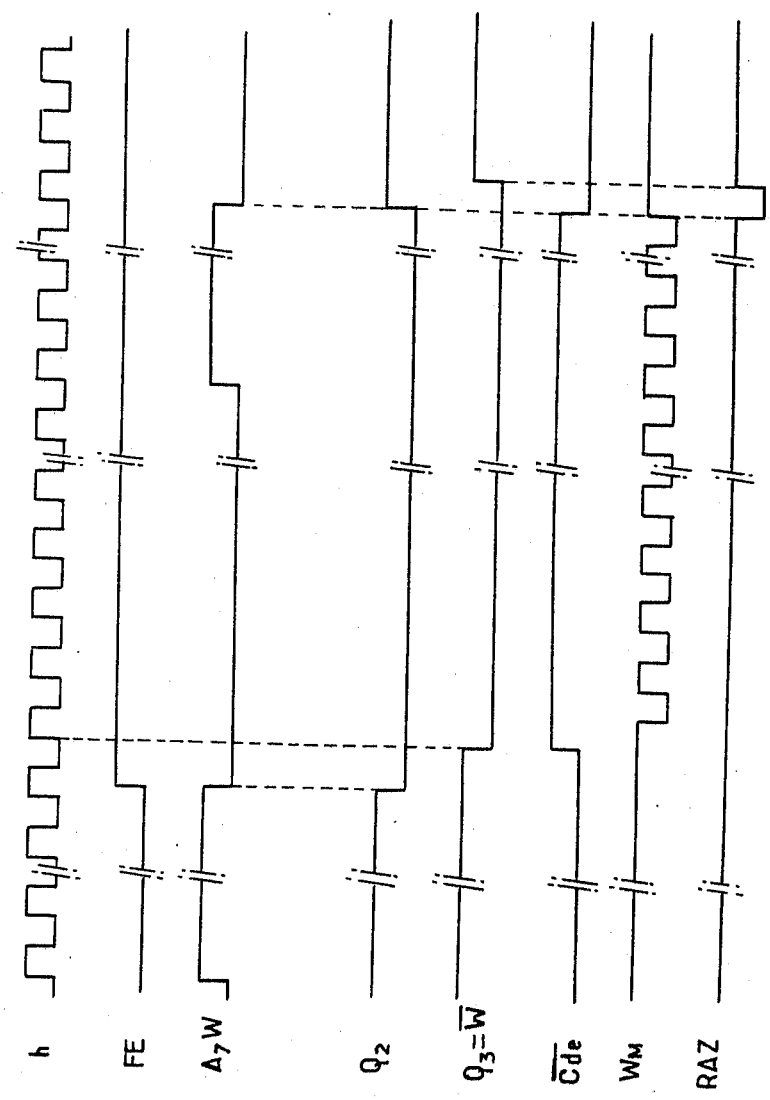
FIGS. 29, 30, 31, 32 and 33 are diagrams representing as a function of time various signals involved in the described circuits.

All the orders are processed in accordance with the flow charts of FIGS. 7, 9 to 11, 17 to 19 and 22. FIGS. 29 to 33 show as a function of time, the main signals processed and FIG. 28 is a simplified synoptic diagram of a control logic L.

It substantially comprises:

a master clock H supplying the timing signal $h$;

a counter ADM with 12 states, a phase counter Φ and combinatory logic circuits LC processing the various control orders $hf$, $fro$, $hi$, $am$, $bm$, $cm$, W, in accordance with the various flow charts based on the state of the counters on the one hand and on the value of the variables characterised on the tests performed by the processes (DepX, DepY, $T_1$, $T_2$, $T_3$, $T_4$);

a device R receiving data supplied by the acquisition system, whereby the end of print-out signal FE coincides with the drop of $A_{7W}$, the last of the 8 print-out bits $A_{07}$ to $A_{7W}$.

As soon as FE appears, this device, in syncronism with $h$ transmits a control signal C$de$ which brings about the transmission of data from the acquisition system memory, together with the recognition system memory. Transmission is at an end when the print-out address bit $A_{7W}$ (2nd bit $A_{7W}$ in the drawing, the first corresponding to the print-out in the acquisition system) returns to the zero state.

The diagram also shows:

signals Q2 and Q3, defined from FE and A$iW$ serving for the processing of the control signals;

signal W (FIG. 26) which branches to the input of memory M either the addresses A$iW$ from the acquisition system or those generated by the address processor of the recognition system;

the print-out signal $W_M$ of memory M which appears at the end of the first timing pulse in accordance with the control signal and terminates with the end of the final printo-out bit in M, $A_{7W}$;

the general zero resetting signal RAZ which coincides with the end of $W_M$ and lasts for one timing pulse.

Figure 30:
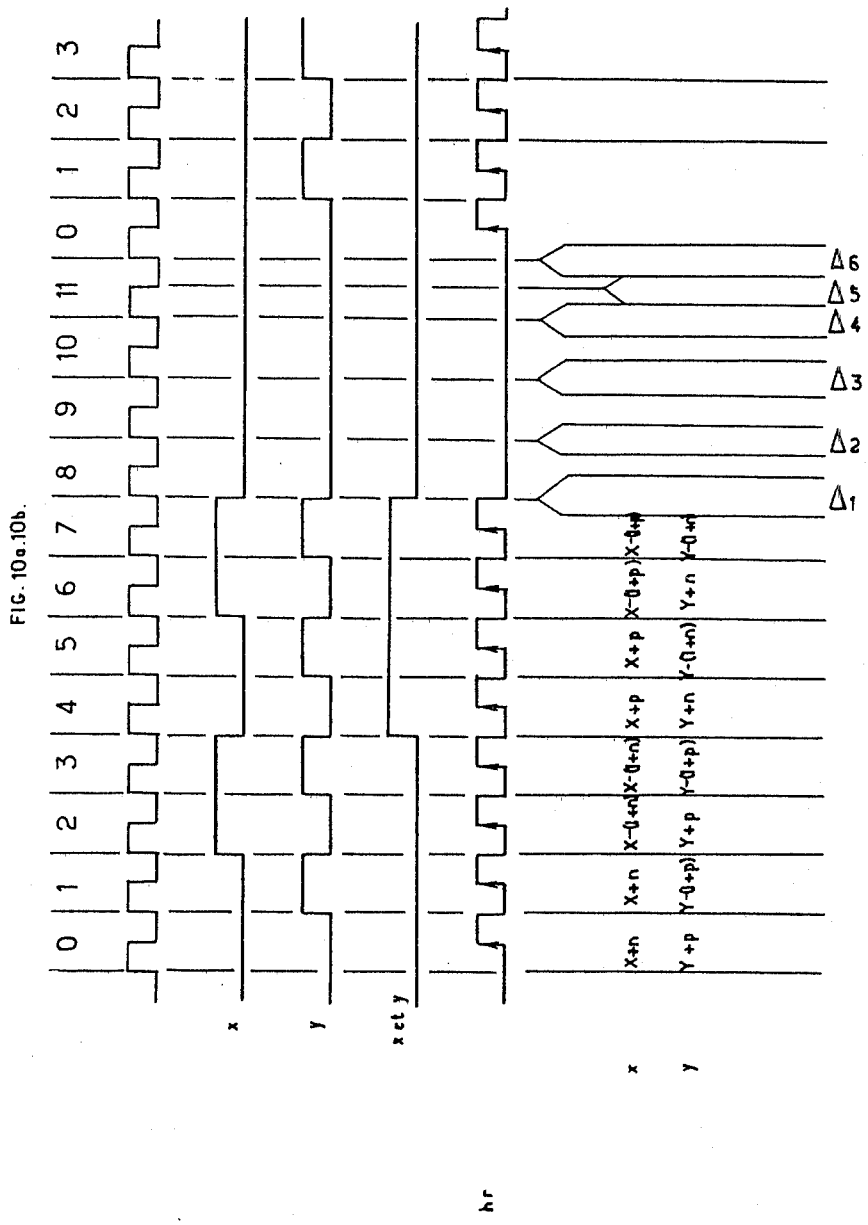

The states of counter ADM are shown on the diagram on FIG. 30 which shows the various control signals of the address generator M of FIG. 26 and the values of the corresponding addresses:

the signals $A_m$ and $b_m$, or operator control for $y$ and $x$ which determine whether the operation is $+n$ or $+p$ on the one hand or $-(n+1)$ or $-(p+1)$ on the other;

signal $c_m$, or the operand control of address $x$, $y$; signal $hr$ which synchronizes the loading of the registers.

This diagram also shows at $\Delta_1$, the installation of semaphores if $n \neq 0$, or the storage of the storage of the validations if $n = 0$;

in $\Delta_2$ the incrementation of the integral counters $T_V$, $6_H$, $6_G$, $6_D$;

in $\Delta_3$ the incrementation of the counters of $p$ (E$p$ = +1), and the storing of Q$i$;

in $\Delta_4$ the incrementation of the counter of $n$ and the zero resetting of Q$i$ as well as the zero resetting of semaphores F$i$;

in $\Delta_7$ the assignment phase of a point to a memory $m_V$;

in $\Delta_8$ the incrementation of X or Y and the zero resetting of counters $6_V$, $6_G$, $6_H$, $6_D$.

Figure 31:
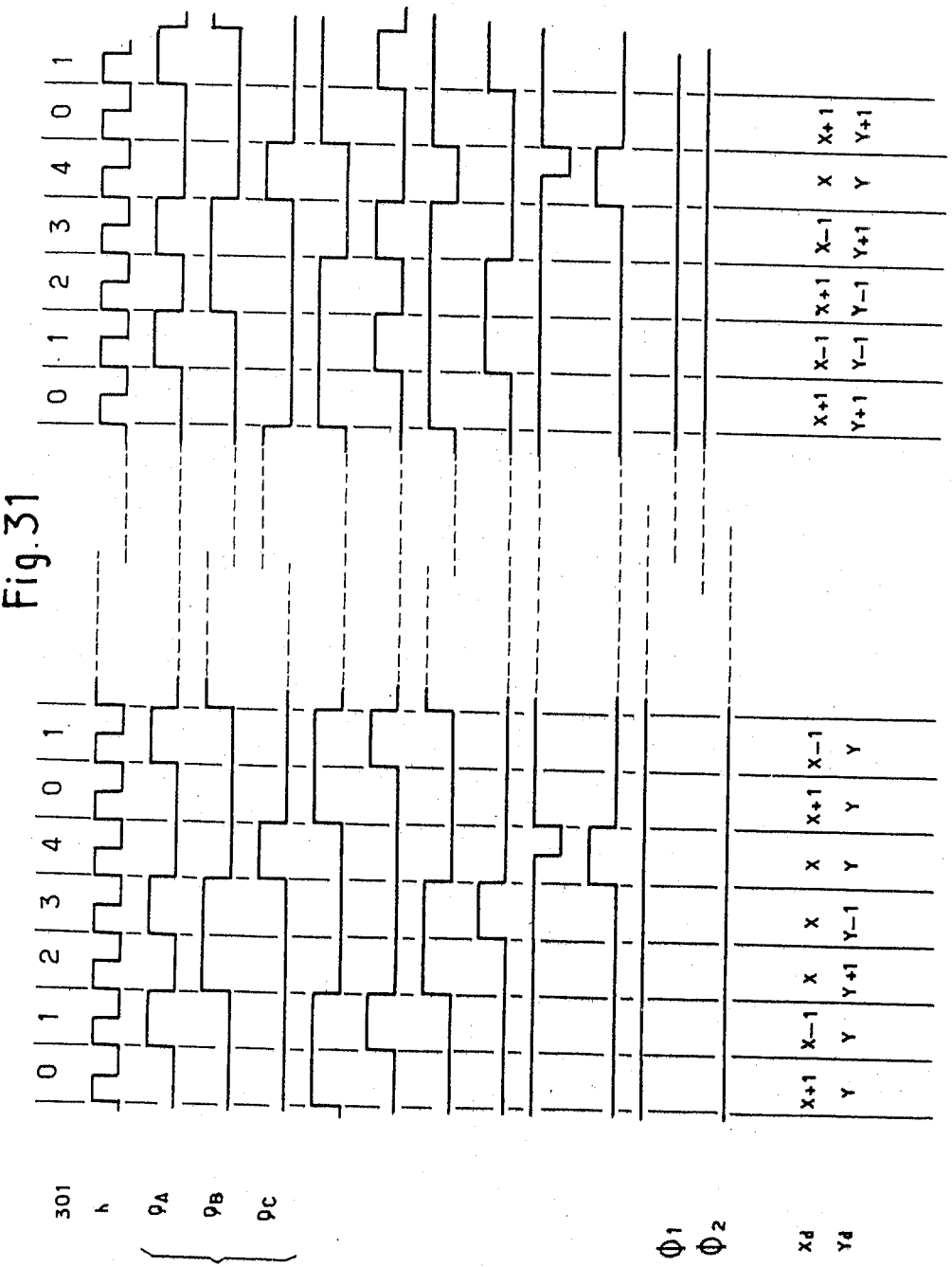

The states of the five state counter 301, the 4 state address generator M and its three bits $Q_A$, $Q_B$, $Q_C$ synchronized by $h$ are shown in FIG. 31 which represents the various control signals of address generator $m$ of FIG. 27 and the values of the corresponding addresses:

signals $\pi_X$ and $\pi'_X$ of the control logic for calculating the address X (FIG. 27), respectively the operand control and operator control of address X;

signals $\pi_Y$ and $\pi'_Y$, respectively having the same functions for address Y.

Figure 32:
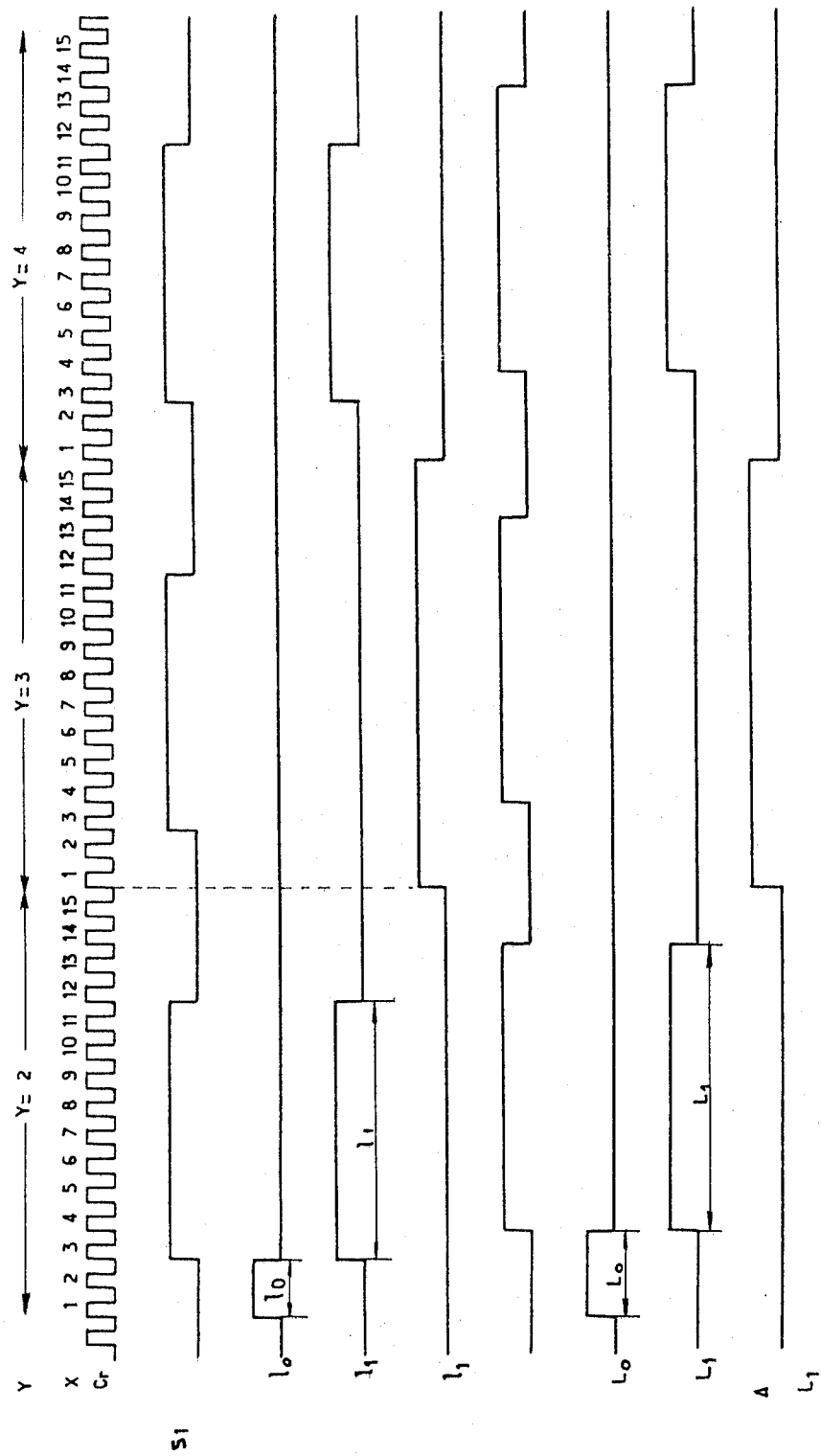
Figure 33:
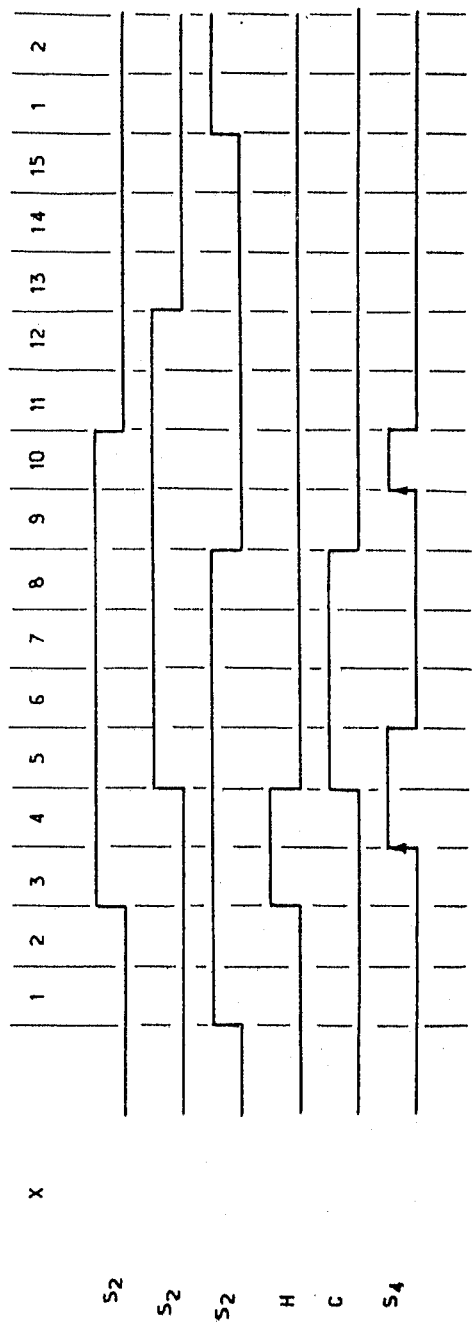

The zone calculation processor control signals are shown in FIGS. 32 and 33, with different scales to make these diagrams clearer.

The operating speed of the device according to the invention is essentially limited by the access time to the memories, the propogation time relative to the logic only being involved to a lesser extent. The circuits used are preferably constructed in accordance with TTl-type technology. In a device according to the invention, constructed with the equipment described hereinafter, the timing frequency is of the order of 5 Mc/s, permitting the recognition of an alphanumerical character in a maximum of 5.3ms, whereof about 4.5ms are used for extracting the segments. This time can be reduced but then more equipment would have to be used and the memory M would have to be replaced by several sub-memories which would be simultaneously scanned.

The following are examples of the type of equipment used in a circuit constructed according to the invention:

all the logic circuits are produced according to the mainly negative Schottky TTL technology;

memories M and $m$ Intersil MM5523 and Texas Instruments equipment;

8 bit series-parallel registers (61, FIG. 6, 213, FIG. 26); SN 74 164 (Texas Instruments);

quadruple flip-flop D with zero resetting (63 and 64, FIG. 6): SN 74-175;

entirely synchronous 4 bit counters ($6_V$, $6_H$, $6_G$, $6_D$, FIG. 6–206, 108, FIG. 26 – 301, FIG. 27 – and ADM, FIG. 28): SN 74.163;

cascadable 4 bit comparators (60, FIG. 6; 15$b$9, 10, 11, FIG. 6; 202, FIG. 26): SN 74–85;

2 channel quadruple multiplexers (15$a$4, FIG. 16 and 203, 204, 209, 212, FIG. 26) : SN 74–157;

1- 16 channel demultiplexers (15a3, FIG. 15): SN 76-154;

2 channel double multiplexers (15a6, FIG. 15): SN 74-153;

4 bit synchronous counters with loading (15b1, 2 3, 4, FIG. 16 - 201 and 210, FIG. 26 - 0, FIG. 28): SN 74-161;

parallel input and output 5 bit registers (15a1, 15a2, 15f, 15q): SN 74-96;

4 bit adders (15b6, 7, 8, FIG. 1; 202, 205, 211, FIG. 26-302, 303, FIG. 27): SN 7483;

double flip-flop D (15b5, 15d, 15e, FIG. 16 and 3 halves of these flip-flops in R, FIG. 28): SN 74-74.

The invention is not limited to the embodiments and uses described hereinbefore, which have only been illustrative purposes. In general manner, the pattern recognition process according to the invention can be applied whatever the acquisition process thereof, provided that at the outset there is a system of binary data corresponding to elementary surfaces defining the character. Although this process has been described relative to its application in the case of characters acquired by scanning along Cartesian coordinates., it can be used no matter what the coordinate system chosen, and the special circuits described as examples can still be used provided that coordinate transformers are associated therewith. It would also be possible to use other circuits designed to operate directly from the coordinates used for scanning.

The process of the invention which substantially consists in the characterization of the character by its orientation in a limited number of zones has been explained in the case where only four types of orientation are differentiated. These are along a horizontal line, along a vertical line, along a positive diagonal and along a negative diagonal, without the slope of these diagonals being differentiated. As has been previously stated for the recognition of the 64 standard alphanumerical characters no useful purpose is served by the differentiation of diagonals with the same general orientation. However, the process according to the invention can be employed with a distinction being made between the slopes of the diagonals, more particularly in the case where it is used for recognising more complex characters. The principle of the circuits described is still completely applicable, and the number of intermediate memories $m$ is obviously equal to the number of types of different segments.

It is finally pointed out that the horizontal and vertical directions has been retained solely for their ease of determination, these directions corresponding both to the preferred directions of a large number of standard characters and to the conventional scanning directions. However, a priori, it is possible to select different directions without passing beyond the scope of the invention.

The invention is not limited to the embodiments described and represented hereinbefore and various modifications can be made thereto without passing beyond the scope of the invention.

We claim:

1. Character recognition system for processing binary data defining a character under the form of a block shaped area within which the character is contained in a smaller block shaped area, the block shaped area being divided into a plurality of rows of elemental areas arranged in matrix fashion, each elemental area having an address and corresponding to a binary data which defines a point of the character when the said binary data has a predetermined value, said system comprising: first circuit means for detecting along which of a plurality of directions the character is oriented at each of the respective points thereof; a plurality of memory means for separately storing the binary data which define those points of the character where the character is oriented along the said respective directions; second circuit means for defining the said smaller block shaped area and for defining, by zone addresses within said smaller block shaped area, a number of pluralities of zones of the said smaller block shaped area which equals the number of directions, each of said pluralities of zones covering the whole of the said smaller block shaped area; third circuit means for comparing the addresses of the zones of the respective pluralities to the addresses of the points contained in the respective memory means and for generating a predetermined binary variable for each zone each time addresses of points contained in one of said memory means coincide with the zone address; and fourth circuit means providing an identification of the character signal, as a function of the said predetermined binary variables.

2. Character recognition system as claimed in claim 1, wherein the said directions comprise an horizontal, a vertical, a positively inclined diagonal and a negatively inclined diagonal directions, and said pluralities of zone comprise first, second, third and fourth pluralities.

3. A character recognition system as claimed in claim 2, wherein each elemental area is a mesh having four apices, the first circuit means comprising means for calculating, for each apex of each mesh of the block shaped area, four integrals which correspond respectively to the points located on either side of the said apex along respective horizontal, vertical, positively inclined and negatively inclined orientation segments, means for comparing the respective values of these four integrals, means for assigning the said mesh apex to one of the first, second, third and fourth memory means depending on the result of the comparisons, and means for confirming the assignment of each mesh apex by determining the existence of at least one mesh apex adjacent to the considered mesh apex on the corresponding orientation segment.

4. A character recognition system according to claim 3, wherein the said calculating means further comprise validation and semaphore placing circuits which prevent taking into account, for calculating the said integrals, the addresses not included in the said block shaped area and the addresses of the points which are not on one of the said orientation segments, even if these points are on the straight line carrying this segment.

5. A character recognition system as claimed in claim 3, wherein the four integrals respectively are:

$$I_H = \sum_{p=0}^{p'_{max}} M[X - (p + 1), Y - 1] \cdot M[X - (p + 1), Y] +$$

$$M[X + p, Y - 1] \cdot M[X + p, Y]$$

$$I_V = \sum_{p=0}^{p'_{max}} M[X - 1, Y - (p + 1)] \cdot M[X, Y - (p + 1)] +$$

$$M[X - 1, Y + p] \cdot M[X, Y + p]$$

$$I_D = \sum_{n=0}^{n_{max}} \sum_{p=n}^{p_{max}} M[X - (n + 1), Y + p] \cdot$$

$$M[X + n, Y - (p + 1)] + M[X - (p + v1), Y + n] \cdot$$

$$M[X + p, Y - (n + 1)]$$

-continued $$I_G = 0 \sum_{n=0}^{n_{max}} \sum_{p=n}^{p_{max}} M[X-(n+1), Y-(p+1)] \cdot M[X+n, Y+p] + M[(X-(p+1), Y-(n+1)] \cdot M[X+p, Y+p],$$

in which $M(x, y)$ is a point of the character, X and Y are the addresses of a mesh apex, $n_{max}$ and $p_{max}$ are the smallest values of a number $k$, where $k$ is respectively defined by the respective inequations $x-(1+k) \geq 0$, $x+k \leq q$, $y-(1+k) \geq 0$ and $y+k \leq q$, $q$ being the maximum value of X or Y and where $p'_{max}$ is the largest value of $k$ defined by the inequations.

6. A character recognition system according to claim 2, adapted to the processing of the 64 standard alphanumerical characters, wherein the first plurality comprises upper, central and lower horizontal zones, the third and fourth pluralities each comprise left and right vertical ones in turn each divided into upper, central and lower zones, and the second plurality comprises: a left vertical zone divided into upper, central and lower zones; a central vertical zone, and a right vertical zone in turn divided into upper and lower zones.

* * * * *